(12) United States Patent
Pipes

(10) Patent No.: US 6,863,822 B2
(45) Date of Patent: Mar. 8, 2005

(54) METHOD AND APPARATUS FOR PARALLEL DESALTING

(76) Inventor: Anthony Pipes, 11 Madrona, Irvine, CA (US) 92612

(*) Notice: Subject to any disclaimer, the term of this patent is extended or adjusted under 35 U.S.C. 154(b) by 43 days.

(21) Appl. No.: 10/272,576

(22) Filed: Oct. 16, 2002

(65) Prior Publication Data
US 2004/0245177 A1 Dec. 9, 2004

(51) Int. Cl.⁷ ............................................... B01D 61/00
(52) U.S. Cl. ..................... 210/652; 210/651; 210/650; 210/638; 210/257.2; 210/195.2; 210/641; 210/636; 210/333.01
(58) Field of Search .................... 210/641, 652, 210/195.2, 257.2, 636, 333.01, 333.1, 639, 651

(56) References Cited

U.S. PATENT DOCUMENTS

| | | | |
|---|---|---|---|
| 4,000,065 A | * 12/1976 | Ladha et al. ................ 210/652 |
| 4,207,183 A | 6/1980 | Herrigel | |
| 4,278,539 A | 7/1981 | Santhanam et al. | |
| 4,618,429 A | 10/1986 | Herrigel | |
| 4,670,150 A | 6/1987 | Hsiung et al. | |
| 5,047,154 A | 9/1991 | Comstock et al. | |
| 5,066,402 A | * 11/1991 | Anselme et al. ............ 210/636 |
| 5,152,904 A | 10/1992 | Kedem et al. | |
| 5,240,579 A | 8/1993 | Kedem | |
| 5,501,798 A | 3/1996 | Al-Samadi et al. | |
| 5,672,280 A | 9/1997 | Demopoulos et al. | |
| 5,925,255 A | 7/1999 | Mukhopadhyay | |
| 6,004,464 A | * 12/1999 | Lien ........................ 210/639 |
| 6,074,551 A | 6/2000 | Jones et al. | |
| 6,103,125 A | 8/2000 | Keupper | |
| 6,113,797 A | * 9/2000 | Al-Samadi ................ 210/652 |
| 6,156,286 A | 12/2000 | Fortier et al. | |
| 6,162,361 A | * 12/2000 | Adiga ...................... 210/652 |
| 6,195,825 B1 | 3/2001 | Jones | |
| 6,270,671 B1 | 8/2001 | Shorr et al. | |
| 6,349,835 B1 | 2/2002 | Saux et al. | |
| 6,461,514 B1 | * 10/2002 | Al-Samadi ................ 210/652 |

* cited by examiner

Primary Examiner—Ana Fortuna
(74) Attorney, Agent, or Firm—Walter A. Hackler

(57) ABSTRACT

Parallel desalting (PDS) includes a hybrid membrane softening (MS) system for de-mineralizing water for residential and commercial use. Parallel desalting produces "soft" water without the use of salt, or any other liquid chemical reagent normally used to carry out pH adjustment in industrial membrane and precipitation processes. The PDS process balances the operation of a RO (potable water) membrane unit with the operation of a tubular MF (wastewater) membrane unit, thereby providing a highly efficient and regenerative water treatment technology: (1) The optimum operation for the PDS system transforms roughly 90 percent of a potable, slightly brackish water supply into <50 mg/L TDS water with <1 -grain (10–15 mg/L as calcium carbonates) water hardness; and (2) The operation of the PDS system produces, in salinity terms, in a 100 percent reusable effluent for downstream recycling. Virtual prototype results suggest that with Colorado River Aqueduct source water (570–620 mg/L TDS and 16-grain water hardness), parallel desalting can produce an effluent with a TDS 40–70 mg/L lower than the originating supply (excluding TDS contributed directly by the particular type of use of the soft water).

22 Claims, 7 Drawing Sheets

METHOD AND APPARATUS FOR PARALLEL DESALTING

FIELD OF INVENTION

The present invention relates to an integrated water treatment method and apparatus, and its efficient and automated operation, in providing a sustainable multiple-membrane solution useful in supplying de-mineralized "soft" water and in desalting its processed effluent.

BACKGROUND OF INVENTION

The membrane softening (MS) process and nanofiltration (NF) membranes are revolutionizing the soft water industry and moving water softening from a chemical-based to a largely membrane-based process. This change is evident at the municipal and industrial plant scales of application. The need for improvements in the water softening process at the residential level of application is no less, and no different, than that at the industrial level. The water utility industry is concerned about the cycle of water use (water conservation) and the chemicals added to hard water to convert it into soft water prior to use and disposal (effluent quality degradation). The predominant residential water treatment process used to soften municipal water is ion exchange.

Membrane softening (MS) has been examined for residential use but not significantly adopted because of high water wastage, brine disposal and non-competitive economics. The MS process produces a de-mineralized permeate stream and a concentrate stream (also called a brine, reject or waste stream). Concentrate disposal may involve injection of the concentrate into a saline aquifer, evaporation, transport by pipeline to a suitable disposal point, or dilution. The disposal of the concentrate in an environmentally appropriate manner usually represents a significant issue and an important cost factor, and it can seriously threaten the feasibility of using MS as a water treatment process.

Difficulty in achieving compliance with wastewater discharge limits is especially pronounced in areas of California with aggressive regional water quality control board programs and in communities dependent upon Colorado River water. Public agencies have not found practical ways to enforce residential water softener regulations, and litigation has arisen over attempts by communities to regulate self-regenerative water softeners. California courts have overturned three local ordinances during the 1990s. State of California Senate Bill 1006, which regulates the installation and use of residential water softening and conditioning appliances, is scheduled to become operative in California on Jan. 1, 2003.

The salt loading impact of residential water softeners on municipal water reclaiming plants has long been a controversial issue. This is because higher salinity increases the treatment costs and reduces the potential for reuse of wastewater for non-potable irrigation purposes. Reclaimed water salinity is typically 250–400 mg/L higher than the originating potable water supply.

The basis for the controversy over the use of inefficient residential water softeners is as follows: The predominant residential water treatment process used to soften municipal water is ion exchange. Part of this treatment process requires the use of a large excess of common salt, which is regularly discharged to the sewer system. Ion exchange processes produce "soft" water by replacing "temporary hardness" ions (calcium, magnesium) with "permanent hardness" ions (usually sodium salts) which are more difficult to subsequently remove from water. In hard water regions facing a future with growing water shortages, the ion exchange approach to water "softening" is becoming regarded as counterproductive and, with respect to its inefficient use in residential water softeners, not in the public interest.

For example, data from a North San Diego Calif. water recycling plant show that de-mineralization is needed to meet the <1000 mg/L TDS requirement for recycled water quality. The total dissolved solids (TDS) of the plant discharge has increased steadily with the use of residential water softening, and future TDS levels are expected to be 1200 mg/l. In average runoff years, the anticipated salinity contributions to the plant discharge are as follows: 600 mg/L TDS from the source water (Colorado River Aqueduct); 350 mg/L TDS from consumptive use; and 80 mg/L TDS attributable to groundwater infiltration. To this 1030 mg/L TDS total must be added a further 50 mg/L TDS from industrial-commercial brines, and 120 mg/L TDS from (discretionary) residential water softener use. Ion exchange use accounts for 170 mg/L TDS of the 200 mg/L TDS excess (violation).

This high salinity contribution from residential water softening must be further examined from the perspective of residential soft water use and the growth of the residential water market. Indoor water use for the San Diego Calif. area accounts for about $1/34^{rd}$ of the combined indoor and outdoor residential water use. Surveys in parts of the San Diego water supply area also indicate that between 25 and 40 percent of households use an ion exchange water softening system. In volume terms, therefore, it would appear that no more than 8–13 percent of the actual residential water supply is softened by ion exchange. The 120 mg/L TDS (salinity) from residential water softening is an extremely large salinity contribution attributed to a relatively small volume of home water treatment.

Water salinity poses a problem that may in the future be resolved through regulation and public oversight. The problem created by the conflicting use of ion exchange for the treatment of hard water supplies can also be addressed through technological innovation. There is a well-defined opportunity for a new, non-conflicting and regenerative technology to meet residential soft water demand. Parallel desalting is proposed as a means to service residential soft water demand in a competitive, environmentally sensitive and socially responsible manner.

The existing residential use of water softeners by water utility customers in Southern California and other water-limited, hard-water regions varies by locality, with the home use of ion exchange (salt) softeners estimated to be between 10 and 40 percent of the residential customers. Obviously householders purchase water-softening equipment because they want the benefits that derive from access to "soft" water. These benefits include the greater cleansing power of soft water, energy savings from reduced hot water heating costs, reduced scaling and spotting, and less use of soap and detergent. Existing alternatives to the residential use of inefficient self-regenerative water softeners include the physical transportation of ion-exchange brine waste to authorized disposal sites (using portable exchange tanks), and the use of more efficient water softening devices.

It could be argued that individual customer demand for soft water should be met with a residential technology that matches industrial-scale efficiencies and capabilities, while also taking into account the larger treatment and water supply problems faced by water supply utilities as a result of increasing salinity. Industrial-sized membrane desalters are currently used in Southern California to convert brackish groundwater sources to potable standards. However, these plants produce an unusable brine reject stream equal to about 20–25 percent of the volume of water processed. This waste stream, containing a high concentration of salts and other chemicals added before membrane filtration, must be discharged to the ocean or otherwise treated at a disposal facility.

In residential (household) environments, the possibility for developing a high-recovery membrane performance is subject to a number of other important constraints. Living spaces basically preclude the use and/or storage of reagent chemicals for the treatment process, and residential plumbing codes also restrict the use of high operating pressures. High operating pressures are commonly used for ultra pure water production in commercial and industrial membrane applications. A 70–75 percent level of water recovery is, nevertheless, considered by water utility companies to be unacceptable for residential applications.

PRIOR ART

With respect to the prior art, a first set of four references (U.S. Pat. No.(s) 5,501,798, 5,925,255, 6,103,125, 6,113,797) addresses the use of reverse osmosis (RO) and nanofiltration (NF) membranes in water softening and water de-mineralization.

A second set of seven references (U.S. Pat. No.(s) 4,207,183, 4,278,539, 4,618,429, 5,152,904, 5,240,579, 5,672,280, 6,156,282) concerns the use of open/closed loop precipitation systems, precipitation dynamics, and process parameters needed for precipitation efficiency.

A third set of three references (U.S. Pat. No.(s) 4,670,150, 5,047,154, 6,270,671) concerns the use of tubular microfiltration (MF) to separate precipitated solid particles from circulated concentrate streams and the use of "dynamic" MF membranes for softening water.

A fourth set of three references (U.S. Pat. No. (s) 6,074,551, 6,195,825, 6,349,835) concerns the specialized process requirements for systems integration, performance optimization, and automated operation and maintenance.

Set 1:

1. U.S. Pat. No. 5,501,798 (Al-Samadi) discloses a microfiltration (MF)-enhanced industrial RO process for removing soluble and sparingly soluble inorganic salts from an aqueous solution. The method includes operating an RO membrane at a pressure in the range of 100 to 200 psig in excess of the membrane osmotic pressure. The method includes operating the RO membrane at a pressure in the range of 500 to 1000 psig to provide high system recovery of 90 percent or more. The process is illustrated with two configurations: (1) utilizing an RO membrane unit followed by a small capacity MF membrane unit, and (2) the use of a high capacity MF membrane situated upstream of the RO membrane unit. The maximum system recoveries are achieved with the use of anti-scalants, pH adjustment and other chemicals. The method further provides for controlled precipitation in a zone that does not adversely effect the RO membrane. Retentate is withdrawn at a rate of 50% to 500% of the rate of flow to the RO membrane chamber. A high rate of removal from the high-pressure side of the RO membrane is required to avoid precipitation on the membrane, and to avoid interference with its ability to operate at high efficiency. When it is not desirable to add chemicals to the water treatment system, precipitation can be made to occur on the high-pressure side by super-saturation and seeding or by heating of the retentate. The large recycle stream together with the need for chemical precipitation and the use of MF to separate the precipitate, results in high capital and operating costs. The industrial application of the process is limited and not very economical.

2. U.S. Pat. No. 5,925,255 (Mukhopadhyay) discloses a highly efficient industrial membrane process for removing hardness and non-hydroxide alkalinity from feed water to very low levels. The process achieves permeate recovery ratios of 90 percent or higher with most brackish feed waters, resulting in a substantial reduction in membrane cleaning frequency. The method is useful in the preparation of high purity water. The invention shows the feasibility of operating with high pH feed water while avoiding scaling of reverse osmosis (RO) membranes. The Langelier Saturation Index (LSI) in the final reject zone of the RO membrane unit is maintained in the negative range. For long run times, it is considered difficult to maintain recovery levels greater than approximately 75 percent and avoid carbonate scaling, unless a dissolving condition is produced in the RO reject water. The invention demonstrates that it is feasible to operate an RO-water treatment system at higher than pH 9, in a continuous, sustainable, long-term operation to produce ultra pure product water.

3. U.S. Pat. No. 6,103,125 (Kuepper) discloses several designs for a residential or commercial water desalination and softening system using a softening membrane element. The operation of the system is based upon the recycling and storage of rejected membrane concentrate. The rejected concentrate is mixed with source water for servicing 'other' (non-soft) water uses, and becomes the feed water for subsequent processing. The dynamics of water usage in a home or commercial building is used to periodically flush a re-circulation tank that supplies the elevated TDS water to the treatment membrane. Water for other purposes (flushing) is supplied with a deteriorated quality (increased TDS) as a result of the system operation. As soft water use is increased, the performance of the system deteriorates. The level of soft water use is considered for minimal drinking water requirements (about 2% of interior residential use); hot water use only (about 40% of interior use); selective hot and cold soft water (up to 70% of interior use); and for all water used in a building. With the higher levels of soft water production, it is necessary for the system to discharge substantial amounts of concentrate to the drain. The operating characteristics of the system are not disclosed.

4. U.S. Pat. No. 6,113,797 (Al-Samadi) discloses a two-stage high-pressure high-recovery process utilizing two reverse osmosis (RO) membrane systems. This invention provides for the economical industrial purification of water using a two-stage membrane process with a unique recycle of "softened" membrane concentrate streams. The first stage of the process involves the use of a low-pressure membrane system (normally operated at 200–400 psig) to pre-concentrate scale compounds while purifying the bulk volume of the scale-containing water (using anti-scalants and acid/alkali chemicals for pH adjustment). The first stage membrane system is followed by a second stage membrane system in which the concentrate from the first stage membrane system is treated further at higher pressure (500–3000 psig). The influent water is combined with a recycle stream of concentrate from the second stage process. The second stage is required in order to provide purification of the remaining pre-concentrated stream and to achieve very high overall water recoveries, (normally in the range 95–99 percent). Permeate recovery in the first stage is normally in the range 60–85 percent. Scale formation in the first and second stage membrane systems is prevented by the recycle of "softened" water containing a very low concentration of scale-forming compounds.

Set 2:

5. U.S. Pat. No. 4,207,183 (Herrigel) discloses a method for preventing the formation of deposits caused by precipitating solutes upon membrane barriers in liquid phase separation units. The method comprises providing an effective amount of small nucleation crystals in the fluid stream passing through the separation unit. Based upon the selection of the amount and size of the nucleation crystals and the process conditions, the precipitation of the slightly soluble solutes will occur upon the nucleating crystals rather than the membrane barrier. The nucleating crystals containing precipitated solute are separated from the units and returned to the circulating fluid by various means.

6. U.S. Pat. No. 4,278,539 (Santhanam) discloses a method and apparatus for removing heavy metals from aqueous liquids. The aqueous liquid is introduced into a circulating liquid loop that establishes a mixing zone, a controlled precipitation initiating zone, a crystal growing zone and a crystal settling zone. The invention comprises the several steps and the relation of one or more of such steps with respect to each of the others, and the apparatus embodying features of construction, combination of elements and arrangement of parts which are adapted to effect such steps. The aqueous feed liquid containing dissolved hydrogen sulfide at a pH below that at which the sulfide is precipitated then is mixed in the loop with a pH-adjusting liquid; and the degree of super-saturation with respect to the metal sulfide is maintained within the controlled precipitation initiating and crystal growing zones in the metastable condition so that the growth rate of the metal sulfide crystals remains greater than under uncontrolled conditions vis-a-vis the nucleation rate to effect the production of metal sulfide crystals of a character which makes it possible to separate them through clarification and filtration. The quantity of liquid circulating in the loop is kept essentially constant, and the residence time in the loop may be up to two or three hours, or may be as short as 15 to 30 minutes.

7. U.S. Pat. No. 4,618,429 (Herrigel) discloses a method for maintaining an adequate level of seed crystal in solution concentration systems using preferential precipitation to control scaling and fouling, especially in systems concentrating solutions at concentration factors of about 2 or less.

8. U.S. Pat. No. 5,152,904 (Kedem) discloses a process for softening hard water by precipitation of calcium carbonate. The invention teaches that the crystallization of calcium carbonate by the mere addition of a base to natural hard water is slow in spite of over-saturation because of very slow crystal growth. This is because with a small amount of crystals initially formed in dilute solutions, the chance of crystal growth by the deposition of ions on the already formed crystals is small. The hard water is rendered alkaline with the addition of sodium hydroxide, and is then contacted with calcium carbonate crystal seeds to induce a rapid precipitation of dissolved calcium carbonate on to the suspended particles. The process includes steps for the separation of the soft water and the re-circulation of the seed crystals to soften more hard water. The invention further teaches the separate withdrawal of precipitated calcium carbonate and soft water, following the intimate contact between the alkaline hard water and the circulating calcium carbonate crystals that are retained in a large excess over the amount of calcium carbonate to be precipitated. The invention teaches the raising of pH and the use of seed particles, especially at elevated temperatures, to activate the slow water softening reaction. The invention is illustrated for both laboratory-scale and industrial applications.

9. U.S. Pat. No. 5,240,579 (Kedem) discloses an alternative integrated process for softening hard water by precipitation of calcium carbonate on to seed crystals, which does not require the addition of an alkali. The invention uses an electrolytic water splitting process for the alkalization of the hard feed water, which is withdrawn from a stack of asymmetric bipolar ion-exchange membranes. The water softening method is considered suitable for both industrial and domestic applications.

10. U.S. Pat. No. 5,672,280 (Demopoulos) discloses a method for the removal of heavy metal contaminants from industrial wastewater which comprises incremental adjustment of the pH to maintain a low saturation ratio and recycling of slurry to provide seed crystals for secondary nucleation. The precipitation process which gives rise to heavy metal hydroxide crystals operates by two principal mechanisms, namely, nucleation and crystal growth. Both mechanisms are controlled by the saturation ratio of the precipitating solution. High levels of super-saturation promote homogeneous nucleation and the production of colloids. Secondary (surface) nucleation that results in crystal growth predominates at lower super-saturation levels. The process requires that the pH be adjusted in a series of small increments.

11. U.S. Pat. No. 6,156,286 (Fortier) discloses a commercial method for the production of fine-grained aragonite precipitated calcium carbonate (PCC) by seeding with coarse-grained aragonite. PCC (aragonite or calcite) that is used as a filler pigment or as a coating application in the manufacture of paper, is manufactured by carefully controlling the chemical reaction conditions. Seeding is an effective and commonly employed method for controlling nucleation. Fine-grained aragonite is defined as having 50 percent or more (preferably 60 to 80 percent of solids) mass fraction particles of less than 0.5 micron, and a mean particle size preferably between 0.3 and 0.4 micron. Coarse-grained aragonite can be defined as having a median particle size greater than 0.5 micron, and less than 50 percent less than 0.5 micron. Calcium carbonate scale usually precipitates as calcite at low ambient temperature and increasingly as aragonite at temperatures at or above 40 degrees C.

Set 3:

12. U.S. Pat. No. 4,670,150 (Hsiung) relates to cross-flow MF softening for the removal of dissolved, suspended and colloidal solids from water. The invention incorporates a cross-flow MF module as an integral part of a lime softening system. The process accomplishes lime softening at high solids concentration, e.g., as high as 10–12%, by weight, without incurring debilitating scale-up of the tubular MF tubes, at feed flow through the center of the tubes typically less than 40 psi. Above a certain solids concentration, the majority of the suspended solids are retained at the inner wall of the MF tube and quickly form a "dynamic membrane" (also referred to as a "filter cake" or "sludge layer"). A steady state operation is maintained for periods of time ranging from hours to days by balancing the hydrodynamic shear force with the solids deposition force. Chemicals are added to the feed water to increase the permeability of suspended solids and to enhance the hydrodynamic shear effects.

13. U.S. Pat. No. 5,047,154 (Comstock) discloses a method for increasing the time-averaged cross-flow MF flux of solids-laden liquids through a thick-walled, porous, thermoplastic tubes. The formation of a dynamic membrane results in a decline in filtration flux that is approximately exponentially related to filtration time. An increase in time-averaged cross-flow filtration flux is achieved by throttling the flow rate of filtrate in the product line so as to maintain a constant flux rate at a level below the ordinary start-up flux (i.e., at time zero). The filtration characteristics of the MF tubes combine both the "in-depth" filtration aspects of multi-media filters and "thick-skinned" aspects of UF membranes.

14. U.S. Pat. No. 6,270,671 (Shorr) discloses a method and apparatus for reducing the concentration of dissolved materials, such as ionic compounds, that contribute to water hardness. The method is practiced by passing water containing a precipitate through a tube that comprises a porous semi-permeable membrane with a pore size of less than 1 micron. Optimum amounts of precipitate allow for adequate flow through the walls of the tubular membrane with a reduction in specific dissolved solids species as well as a minimization of the frequency with which the tubular membrane must be cleaned. A level of solids in the water of 2–3% was shown to provide effective results. Generally the pH of the water is adjusted to maximize the precipitation of the constituent to be removed from the water. The efficiency of the method and apparatus was found to be highest at levels of turbulence that were great enough to prevent any significant build up of precipitated material while at the same time not being so turbulent as to prevent even the momentary formation of an effective dynamic membrane. The invention maintained very high efficiencies of calcium and magnesium removal with operating pressures up to 200 psi, producing increased filtrate flux rates through the membrane wall, and a trans-membrane pressure of 30 psi. Filtrate received from the outside of the tubular membrane contained levels of dissolved compounds at concentrations below those that would be predicted by the solubility limits of the compounds.

Set 4:

15. U.S. Pat. No. 6,074,551 (Jones) discloses an automatic cleaning system for a commercial RO unit in a high-purity water treatment system. The automatic cleaning system includes: (1) a means to recycle a high proportion of produced concentrate to create a high cross-flow velocity in the membrane unit during the purification operation; (2) a chemical injection system used for cleaning during a purge/flush cycle; (3) a means to modify the hydraulic pathways of the system through the use of controllable solenoid valves; and (4) a programmable logic controller to activate the purification, purge and chemical injection cycles. A further means was provided to maintain the rated capacity of the system, operating at compensating higher pressures and lower feed water temperatures.

16. U.S. Pat. No. 6,195,825 (Jones) discloses a commercial wastewater treatment system and recycling process that reduces water, energy and chemical consumption in laundry operations. The invention discloses a closed-loop system for reusing a portion of the hot wastewater effluent after it has been filtered through a tubular MF unit. For operations with a low total dissolved solids (TDS) requirement, a secondary pump is utilized to raise the operating pressure of the filtered water from the tubular membrane unit to about 150 psi so that it can be further processed in a NF unit. The NF reject is disposed to a sewer line.

U.S. Pat. No. 6,349,835 (Saux) discloses a method and apparatus for improving the quality of domestic water. The apparatus, comprising membrane filtration and a downstream reverse osmosis (RO) filter, includes a product water supply circuit and an auxiliary cleaning circuit, with multiple hydraulic pathways activated by means of solenoid valves. Ultra-filtration (UF) water is provided for ordinary water use and osmosis-treated (OS) water is produced for drinking water. The RO membrane is kept clean by the intermittent flow of UF water and is further maintained by regular cleaning cycles. The salinity of the UF product water is not reduced, and it is not considered feasible to satisfy economically all ordinary requirements with water treated by osmosis. Only a small quantity of OS water is produced. The UF membranes require periodic cleaning. This is accomplished by the re-circulation of UF-filtered water back through the UF membrane unit, in a reverse-flow direction. Furthermore, the configuration of the pre-filter (UF) requires at least two, and preferably three or more filter modules, arranged in parallel, and hydraulic circuits are provided for individually cleaning the modules of the pre-filter unit (UF). The UF modules are cleaned with brine that is converted into a chemical-oxidizing agent. During the cleaning cycle, an electrode in the cleaning circuit is excited to generate chlorinated water from the brine. The apparatus is illustrated with a brine generator and a cleaning product storage tank that charges the cleaning fluid—UF product water—with salt (sodium chloride). The apparatus discharges the brine to waste together with UF water used to flush out the cleaning fluid. The RO membrane and UF system recovery factors are not addressed. RO concentrate is mixed with UF water in a UF water reserve tank that is used as a buffer, and serves to prevent the equipment startup when only a small amount of UF or RO water is drawn off.

In summary, the above prior art collection makes reference to a number of processes and practices that are constituted in the design and operation of the parallel desalting apparatus and method:

i. a MF-enhanced RO/NF membrane process
ii. the precipitation of slightly soluble solutes on to nucleating crystals
iii. the maintenance of metastable conditions to control precipitation on to crystals
iv. the incremental adjustment of pH, and the maintenance of low saturation ratios
v. the recycling of slurries to provide seed crystals for secondary nucleation
vi. the maintenance of an adequate level of seed crystal solids
vii. the softening of hard water by the precipitating of calcium carbonate on to seed crystals which does not to require the addition of an alkali
viii. the raising of pH and the use of seed crystals (especially at elevated temperature) to activate slow water softening reactions
ix. the use of optimum amounts of precipitate for adequate permeate flow through a tubular MF membrane, while allowing for the formation of a "dynamic membrane"
x. the raising of time-averaged flux through a tubular MF membrane by throttling the production flux below the ordinary startup flux
xi. the use of a micro-processor controlled operation and the modification of hydraulic pathways through the use of controllable solenoid valves.

OBJECTS AND ADVANTAGES

It is an object of the invention to provide an improved process for softening hard alkaline water supplies using a hybrid membrane softening system at improved recovery levels without jeopardizing the long-term performance of the system.

It is another object of the invention to provide a "chemical-free" water softening process that can be operated to produce de-mineralized, premium-quality product water.

It is an object of the invention to accomplish a partial reduction in water hardness by incorporating within a hybrid membrane softening system, a process involving the use of suspended crystal seed particles of calcium carbonate, whereby dissolved calcium hardness ions are efficiently removed from the treated aqueous solution by anhydrous precipitation, and incorporated into the solids crystal particle structure.

It is another object of the invention that the TDS of the effluent discharged from the system during its operation should be reduced to a level below that of the originating source water, thereby providing, in salinity terms, a 100 percent reusable effluent.

It is a further object of the invention to provide a water softening method whereby the amplitude of the pH fluctuation of the water re-circulating within the apparatus is conducive to the efficient and timely removal of calcium hardness and the operation of the softening membrane at high system recovery.

It is an object of the invention to provide a micro-processor controlled operating system for the improved water softening process that is responsive to the pattern of soft water demand.

It is yet another object of the invention to provide a micro-processor controlled operating system for an improved water softening process that conducts preventative maintenance of the membrane elements and conditions the water stored in apparatus between periods of soft water production and supply.

It is another object of the invention that the improved performance of the system should be achieved with the use of moderate water pressures and temperatures, and with operational process and flow conditions in the apparatus that make it suitable for economical and efficient use in a residential environment.

For example, for residential applications, the improved performance of the system would include operating the RO membrane at a pressure substantially less than 100 psig in excess of the membrane osmotic pressure. Typically, the RO membrane would be operated at a pressure in the range 75 to 100 psig, to provide a high system recovery in excess of 85 percent. These and other objects will become apparent from the discussion, specification, claims and drawings included in this document.

SUMMARY OF THE INVENTION

Apparatus in accordance with the present invention for membrane softening of potable water generally includes a reverse osmosis (RO) membrane for softening and demineralizing potable water. The reverse osmosis (RO) membrane produces an (RO) permeate and an (RO) concentrate. A microfiltration (MF) membrane is provided for receiving the (RO) concentrate and producing an (MF) permeate and (MF) concentrate.

Hydraulic pathways are provided for recycling the (MF) permeate to the potable water for return to said reverse osmosis (RO) membrane at a pH level suitable for suppressing deposition of solids on the reverse osmosis (RO) membrane. In addition, lines are provided for delivery of (RO) permeate for use.

More particularly, apparatus according to the present invention further may include a concentrate storage tank including seed crystals, the storage tank being in fluid communication between the reverse osmosis (RO) membrane and the microfiltration (MF) membrane for receiving (RO) concentrate at a pH that is conducive to metastable precipitation of calcium carbonate on the seed crystals. In addition, the hydraulic pathways may include a permeate storage tank interconnected between the (RO) membrane and the delivery lines.

Further, a permeate delivery pump may be provided for both providing water pressure to the delivery lines and for recirculation of (RO) permeate through the (RO) membrane for cleaning thereof. A recirculation line may be provided for enabling the recirculation of (RO) permeate through the (RO) membrane and a control system for causing the permeate delivery pump to operate so as to either provide water pressure to the delivery lines or to recirculate (RO) permeate through the (RO) membrane.

A circulation pump may be provided for recycling the portion of (RO) concentrate to the potable water and for recirculation of stored concentrate from said concentrate storage tank through the (MF) membrane.

In addition, a line interconnecting the (MF) membrane and said concentrate storage tank may be provided for enabling the recirculation of the stored concentrate from said concentrate storage tank. The control system may be operable for causing the circulate pump to operate so as to recycle portion of the (RO) concentrate to the potable water and to recirculate stored concentrate from the concentrate storage tank through the (MF) membrane.

A line interconnecting said concentrate storage tank and a drain may be provided for disposal of concentrate storage tank contents. Preferably, the apparatus according to the present invention provides for softening of potable water without the addition of any chemicals, such as, for example those necessary for the operation of conventional ion exchange water softeners.

A method for softening and demineralizing of potable water in accordance with the present invention generally includes the steps of providing a reverse osmosis (RO) membrane and introducing potable water to said reverse osmosis (RO) membrane in order to produce an (RO) permeate and an (RO) concentrate.

The method further includes the steps of providing a microfiltration (MF) membrane, introducing the (RO) concentrate to said microfiltration (MF) membrane to produce an (MF) permeate and an (MF) concentrate, recycling the (RO) permeate to the potable water for return to said reverse osmosis (RO) membrane; recycling a portion of the (MF) concentrate to the potable water for return to said reverse osmosis (RO) membrane at a pH level suitable for suppressing deposition of solids on the reverse osmosis (RO) membrane, and providing (RO) permeate for use through a delivery line.

The method according to the present invention may further include the steps of providing a concentrate storage tank including seed crystals and introducing the (RO) concentrate into said concentrate storage tank at a pH that is conducive to metastable precipitation of calcium carbonate on the seed crystals.

Further, the concentrate storage tank may include the means to heat the contents of the concentrate storage tank and to enable the metastable precipitation of calcium carbonate on the seed crystals with stored water temperatures in excess of the ambient temperature of the originating water supply.

In addition, the method of the present invention may further include the step of intermittently recirculation (RO) permeate through the (RO) membrane for cleaning thereof and intermittently recirculating stored (RO) concentrate from said concentrate storage tank through the (MF) membrane.

More particularly, the method according to the present invention may further include the step of mixing concentrate from said concentrate storage tank with used (RO) permeate for disposal therewith.

It should be appreciated that the method in accordance with the present invention may be performed without the use of added chemicals as hereinabove noted.

BRIEF DESCRIPTION OF THE DRAWINGS AND TABLES

A better understanding of the present invention may be had with the consideration of the following detailed description, taken in conjunction with the accompanying drawings and tables in which:

FIG. 1 illustrates a RO (potable water) membrane unit and a tubular MF (wastewater) membrane unit, and the configuration of these two membrane units in relation to water storage vessels, pumps and other components of the invention;

Figure 6:
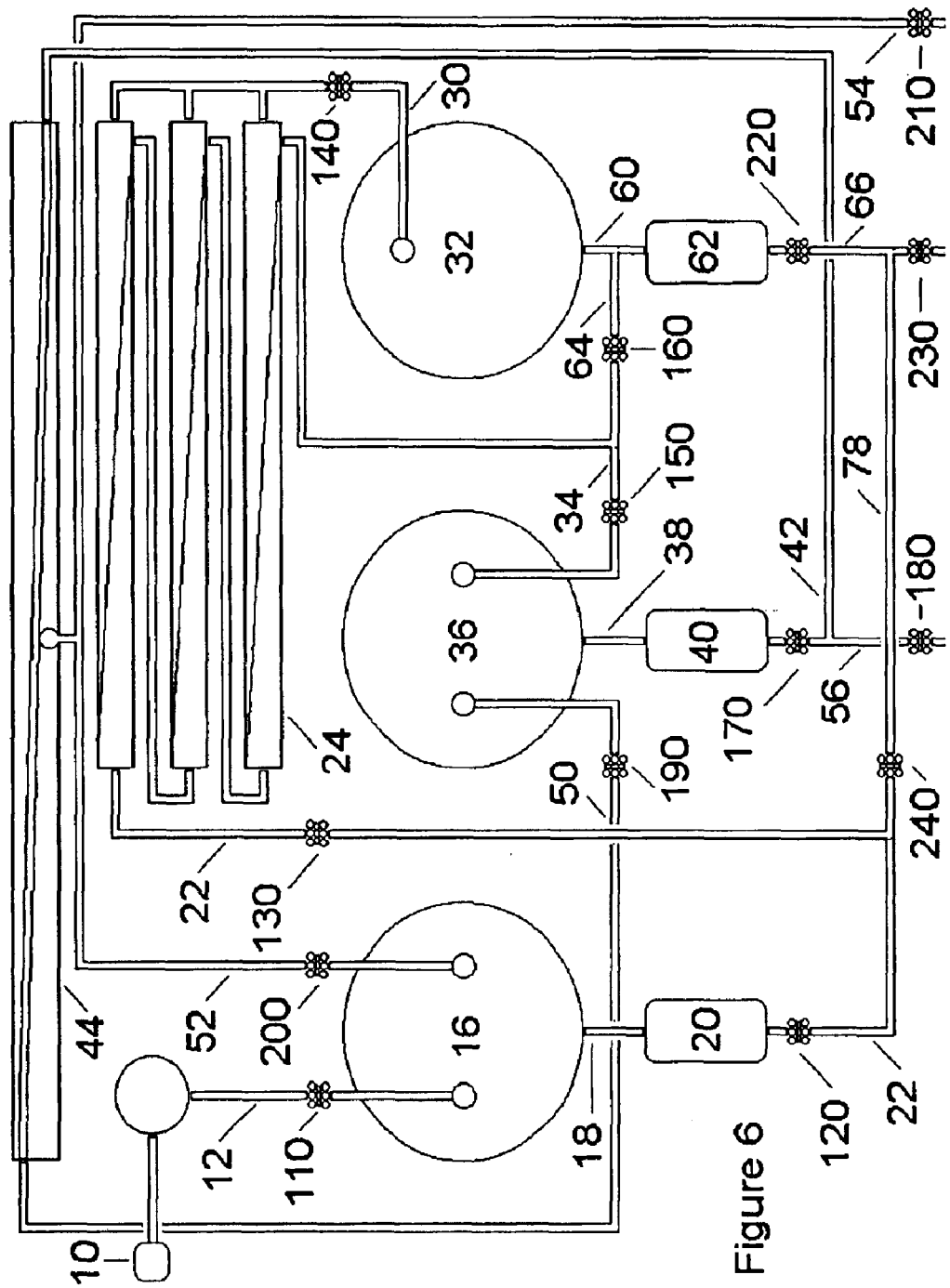

FIG. 6 is a plan view schematic of a preferred embodiment of the parallel desalting (PDS) apparatus. FIG. 6 shows a layout for a RO membrane unit 24 (shown as comprising three membrane elements), a tubular MF unit 44, and the hydraulic components of the PDS system. The means for controlling the flows, water pressures and temperatures, and the water chemistry within the PDS apparatus, is illustrated by the placement of control system sensors, and data monitoring and data collection sites 190–270 that are attached to hydraulic lines and major components of the PDS apparatus; and FIG. 7 is a schematic of the PDS control system network for the PDS apparatus.

Figure 7:
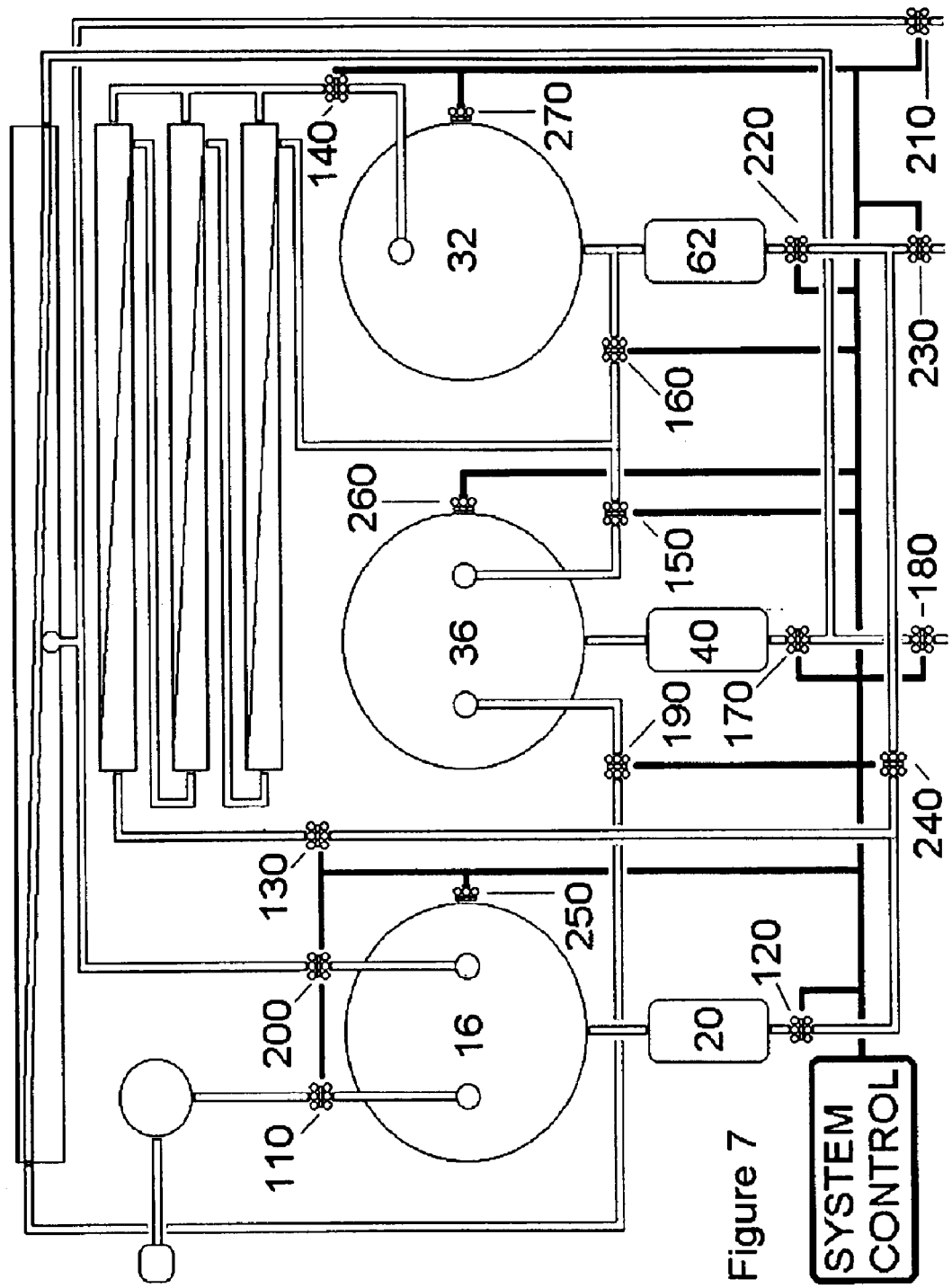

Table 1 provides a description of the PDS Components as identified in FIGS. 1–5; and Table 2 provides a description of the PDS Control and Monitoring System requirements as identified in FIGS. 6 and 7.

GENERAL DESCRIPTION OF THE INVENTION

The present invention, a system for parallel desalting (PDS), provides as a method and apparatus for the efficient removal of hardness and other mineral ions from potable water. The opportunity to raise the performance of membrane softening (MS) arises from two conditions: (1) The initial high quality of potable (slightly brackish) water processed by the PDS system; and (2) the ability to produce soft water on a steady, intermittent basis. Intermittent supply can accommodate the low volume and the 24hour pattern of residential soft water demand. These two factors create the opportunity to employ an innovative and more flexible operating system in membrane softening (MS). This multiple-membrane PDS operating system constitutes an important aspect of the present invention.

Parallel desalting (PDS) creates a dual processing path that enables water softening to be efficiently carried out in both permeate and concentrate streams. The softening of both membrane-separation streams (by different means) is more effective in combination, and their joint action enables the operation of the PDS apparatus to sustain recovery efficiencies of 85 to 90 percent. This expected performance for parallel desalting places membrane softening in a viable range for residential application. PDS represents a major improvement over desalting performances in the 70–75 percent recovery range.

Parallel desalting (PDS) is a hybrid membrane softening system. The term 'hybrid' refers to the configuration of two or more (that is, more than one) desalting processes in the PDS system. The use of separate desalting processes for permeate and concentrate streams, and the controlled release of treated (reduced calcium hardness) concentrate to coincide with the discharge of permeate effluent, enables the concentrate disposal problem for the PDS operation to be resolved by dilution. The dual softening process causes the TDS of the blended effluent released from the hybrid system to be reduced to a level below that of the originating water supply. This is accomplished along with a significant reduction of the volume of concentrate released. With the interaction of the two water-softening processes and the use of an alternating PDS system of operation, the treated concentrate discharge volume can be reduced from 20 to 30 percent (conventional MS plant operation) to about 10 percent of the originating water.

Parallel desalting may be implemented on several scales of application. PDS may be effectively deployed as a satellite treatment system—being dependent upon and compatible with centralized water treatment, while also maintaining a high-level functionality as a stand-alone system. In this way, residential PDS systems may be integrated with conventional drinking water plant operations: (1) to meet the demand for residential water softening, and (2) to improve the effluent water quality discharged to centralized wastewater treatment plants and water reclamation and water reuse facilities. With larger, more centralized scales of PDS system deployment, other means for concentrate disposal may have to be considered. When the plant operation must be continuous or when it is not directly linked to soft water demand, it is doubtful that the need for a separate brine steam can be avoided, or that significant time-dependent fluctuations in the effluent TDS can be prevented.

Parallel desalting combines a number of water treatment steps and processing activities:

(1) 'pre'-filtration (sediment and activated carbon) of a potable source water;

(2) non-chemical membrane separation of dissolved constituents in the water;

(3) storage of permeate (de-mineralized 'soft' water) at ambient temperature;

(4) storage, heating, mixing and MF filtration of RO concentrate;

(5) use of seed particles for anhydrous precipitation of supersaturated concentrate;

(6) re-circulation of seed suspensions and precipitated concentrate;

(7) maintenance of the input-output balance of crystal particle suspensions;

(8) recycling of particle-free RO concentrate for high-recovery permeate production;

(9) recycling of RO permeate to clean, dissolve or minimize scaling of RO membrane.

Parallel desalting (PDS) is achieved with the use of two key water-treatment components—a RO (potable water) membrane unit and a tubular MF (wastewater) membrane unit. The combined use of potable water RO and wastewater MF membrane units creates a Point-of-Discharge (POD) performance that distinguishes the PDS system from virtually all other existing Point-of-Use/Point-of-Entry (POU/POE) equipment. The performance of most existing POU/POE devices used for home water treatment is generally totally deficient in consideration of water utility concerns for water wastage and effluent water quality degradation (generated by the home equipment use).

The PDS process balances the operation of a RO (potable water) membrane unit with a tubular MF (wastewater) membrane unit to produce pristine, headwater quality water for customer use, and a net conservation and quality improvement benefit for downstream use of the effluent stream. The RO and MF membrane units incorporated in the PDS apparatus are arranged in conjunction with water storage tanks, pumps and hydraulic connections that provide for water transfer between the components of the system. The physical hardware provides hydraulic pathways that may be activated (opened or closed) by a PDS control system to initiate the several modes of operation for the apparatus. The two types of PDS system operation are production/supply, and internal maintenance and storage conditioning.

All of the water processed by the PDS system, and all of its dissolved constituents, originate from the potable water supplied to the apparatus. The natural constituents dissolved in alkaline, hard water processed within the PDS apparatus usually include some calcium ions and some bicarbonate ions. The world average river-water composition is dominated by calcium and bicarbonate ions, both of which are derived predominantly from limestone weathering. Ninety-eight percent of all river water is of the calcium carbonate type (that is, has calcium and bicarbonate ions as the principal ions).

The operation of the PDS system reduces the concentration of dissolved calcium and bicarbonate ions both in the product water and in the PDS effluent stream of used (softened) water. This reduction in TDS and water hardness in the used water stream is due to the transfer of calcium and carbonate ions on to surface of suspended solid calcium carbonate particles maintained in suspension in the concentrate section of the apparatus. Reagent chemicals are not added to the water contained in the apparatus to facilitate this process or any other processes or reactions that are carried out during parallel desalting.

The design and operation of the present invention requires component and process integration, as well as consideration of its optimal functionality in relation to the product and effluent water quality produced by the operation of the PDS system. The application of parallel desalting is governed by cost-performance tradeoffs that ultimately define its practicality and beneficial impact. This description of parallel desalting is confined to methodology and apparatus and does address cost considerations or economic factors.

Figure 1:
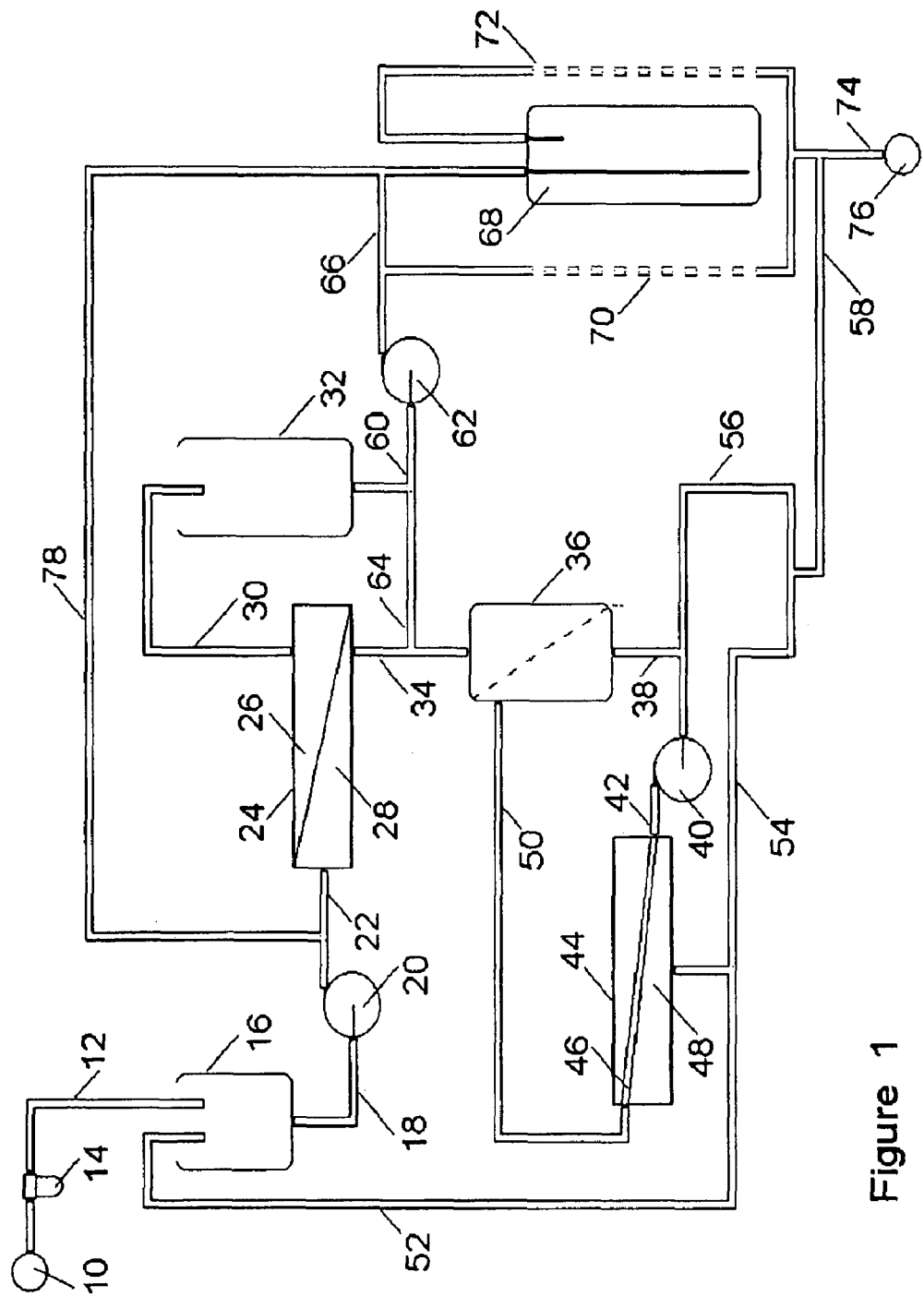
FIG. 1 is a schematic representation of a preferred embodiment of the parallel desalting (PDS) process and apparatus.

FIG. 1 provides a schematic that illustrates the processes of the present invention. The primary production/supply mode for the PDS operation is carried out with an open system configuration. In open-mode operation, a hard, alkaline feed water is provided to the PDS apparatus from an external potable water supply, and de-mineralized soft water is produced by the apparatus and supplied for customer use. In residential applications, the demand for soft water is essentially intermittent. This non-continuous demand pattern makes it possible to cause the release of small quantities of process water used to initiate and sustain a natural seed-precipitation of calcium hardness in the PDS-concentrate stream, to be timed to coincide with the discharge of used soft water.

System conditioning operations are conducted with a closed system configuration during which no water enters or leaves the apparatus. Closed-system operations are conducted during periods that would otherwise represent idle times for the PDS apparatus. Closed operations involving the permeate, particle-free section of the apparatus are designed to carry out preventative maintenance functions, including the regular cleaning of the RO membrane unit.

Closed operations in the seeded-concentrate section of the apparatus are used to carry out water conditioning functions, that is, to advance the seed-precipitation reaction, and to thereby lower the pH of the stored concentrate in preparation for the next soft water production/supply operation. Closed operations in the different sections of the apparatus may be conducted independently or simultaneously.

A control system initiates the various activities of the PDS system, and determines the appropriate sequence of operations. The control system responds to soft water demand on a priority basis. System conditioning activity takes place when various temperature and pressure conditions are indicated in the apparatus. The PDS pathways are changed through the use of solenoid valves that enable the water to flow under pressure to the different parts of the apparatus. Requisite water pressures and temperatures are produced within the apparatus by the operating system in order to maintain the processes of the invention.

The most critical of these processes produce significant changes in the pH of the aqueous liquid, as it is circulated and recycled through the PDS apparatus. Such pH changes are produced during both open and closed operations. The pH of the originating water is modified as the aqueous fluid is physically moved through the apparatus, and the net effect of the operation of the PDS system is to produce a continual cycling of pH change. The major shifts in pH will occur in response to membrane separation and the seed precipitation of calcium hardness in the RO concentrate stream.

Water quality changes within the PDS system are produced as a result of moderate, and not excessive, changes in pH. The RO membrane unit must be operated at relatively low concentration factors to ensure that the precipitation will take place in the seeded concentrate section of the PDS apparatus, within a 'metastable' range. Metastability implies that chemical change and/or the rate of change in the concentration of the constituents in the aqueous fluid will either be naturally slow or be induced at a designated control rate by the state of the aqueous fluid. In any case, chemical change within the aqueous fluid is moderated and designed to proceed through incremental steps.

The pH of the feed to the RO membrane unit is raised in the concentrate stream by the selective action of the RO membrane which separates the mixed ions (charged particles) contained in the water as the aqueous fluid passes through the RO membrane unit. On the low-pressure side of the RO unit, the action of the membrane causes the pH of the permeate stream to fall below that of the aqueous fluid entering the membrane unit. On the high-pressure side of the RO unit, the action of the membrane causes the pH of the concentrate stream to rise above that of the entering fluid, and the maximum concentrate pH is produced at the point of exit from the RO unit.

The maximum pH of the concentrate stream is then lowered in a following section of the PDS apparatus by controlled precipitation (that is, the transfer of dissolved ions on to crystal solids maintained in suspension). The suspended seed reaction and the dynamic operation of a tubular MF unit substantially reduce the previously raised pH of the RO concentrate. The rate of the seed precipitation reaction also regulates the decline of the pH of the precipitating concentrate. A sufficient reduction of the pH of the concentrate fluid can usually be induced within a manageable period of time (a few minutes and not hours) by the activity produced by the concentrated natural alkalinity originating from the source water. In situations where the reaction kinetics are favorable, metastable seed precipitation (that favors crystal growth over primary nucleation) can be employed as a substitute for extraneous liquid chemical use to produce the pH adjustment cycle needed for a non-fouling high-recovery operation of the RO membrane unit.

Following the precipitation of the calcium and carbonate ions on to seed particles in suspension, a portion of the concentrate stream is separated from the particle-carrying fluid by a tubular MF membrane. Most of this particle-free and precipitated concentrate (that is, MF permeate) is recycled back to the RO membrane unit. In order to develop a high recovery of product water from the PDS system operation, a high proportion of the stabilized concentrate must be recycled and mixed with the source water to produce an aqueous mixed fluid at a pH level suitable for supply to the RO unit.

The practicality of carrying out efficient precipitation reactions within a metastable zone of operation is enhanced by the use of seed particles selected from within a narrow micron size range. The precipitation efficiency is also improved by the use of elevated temperature (that is, heat) to supply energy levels needed for the activation of the phase change reaction. Precipitation of calcium hardness (dissolved ions) on to the calcium carbonate seed particles in the concentrate stream, is carried out in a turbulent mixing-tank operation. The hydrodynamics of the seeded flow is maintained by the operation of a circulation pump situated in the RO concentrate circuit. The seeded flow path is isolated hydraulically from the particle-free compartments of the system by operating pressure gradients and membrane barriers. Orderly seed precipitation of the RO concentrate may occur on contact with crystal particles as the entraining re-circulation stream is returned to a mixing-tank with previously precipitated concentrate, or it may occur during particle filtration through a "dynamic membrane" layer formed on the inner surfaces of the tubular MF membrane.

The rates at which the water treatment reactions take place are controlled by the conditions that are maintained at critical locations in the PDS apparatus. The key control variables for the PDS operation are temperature, pressure and pH of the aqueous liquid. These parameters influence the flow conditions (hydrodynamics) and the reaction rates (thermodynamics). When the concentrate pH is substantially lowered by the PDS operation before the concentrate is recycled back to the RO membrane unit, a high RO system recovery can be safely sustained. The actual means by which a high recovery can be maintained without the use of reagent chemicals is the "internal pH cycling" within the PDS apparatus. The calibration and controlled execution of the precipitation reaction is an essential contributory means for operating the RO membrane unit at high recovery without the use of anti-scalants, external pH-adjustment or other chemicals.

The metastable precipitation process is integrated with the RO membrane separation process to achieve optimal functionality of the PDS system. This is accomplished through the alternating sequence of the open and closed modes of PDS system operation. The interdependencies between open and closed modes of operation are examined in the detailed description of the present invention.

DETAILED DESCRIPTION

The functioning of the PDS apparatus is governed by a microprocessor-controlled operating system. The PDS system has the means to produce or supply soft water under three conditions. (1) Under conditions of high soft water demand (HD-mode of operation), the rate of soft water consumption exceeds the rate of soft water production by the RO membrane unit. A delivery pump provides soft water at the user demand rate. Rates of soft water supply in excess of the RO permeate flux are supplied from soft water storage. (2) Under conditions of low or short-interval demand (LD-mode of operation), the RO permeate production pump is not required, and the soft water is drawn from storage and supplied by the delivery pump. While the LD-mode of operation avoids very short-interval production of permeate water and the stop-go operation of the RO-membrane pressure pump, this mode of operation will inevitably create a volume imbalance between soft water demand and the production of soft water. At some point the storage of soft water falls below a minimum reserve level. (3) Under conditions of soft water storage deficit, RO permeate production is carried out within the PDS system to restore the standby soft water reserve. During the production of soft water to meet internal storage demand (SD-mode of operation), the RO membrane operation is carried out for a limited period of time with 100 percent concentrate recycling. This restores the soft water storage volume and without discharge from the apparatus. (The duration of the SD-mode of operation must be restricted because 100 percent recycling will cause the concentrate levels in the seeded section of the apparatus to continuously increase throughout such operation.)

The PDS system has the further means to internally transfer water in closed loop operations, and to sustain slow water treatment activity when RO permeate production and soft water supply operations are not required. When the external and internal demand for soft water has been satisfied, the PDS system is designed to carry out RO membrane maintenance with a permeate-cleaning operation (PT-mode of operation). This occurs routinely after each soft water production operation. While this is taking place, the PDS system will also perform and maintain a water conditioning reaction of seed-precipitation by re-circulating the concentrate circulation stream for a designated period of time (CT-mode of operation). In essence, the internal closed-loop operations "re-initialize" the PDS apparatus in readiness for supplying subsequent soft water demand. The repeated re-initializing of the pH and mineral content of the stored concentrate, enables a higher overall performance of the PDS system to be reached while meeting product water quality, water conservation and water reuse objectives.

A detailed description of the PDS apparatus is provided firstly for the demand mode operations, and then for the internal closed-loop operations for conditioning the stored water and maintaining the membrane elements. These detailed descriptions of the PDS System operations are followed by a description of the electronic hardware and software components that comprise the PDS control system. In the preferred embodiment of the present invention, the PDS apparatus is equipped with a microprocessor-based system that automatically controls the several operations of the system. The automated control system is further coupled with a diagnostics, instrumentation and monitoring capability that is useful in assisting with the calibration and optimization of the performance of the PDS system. Component specifications and sources of supply are provided for the major components of the present invention.

With respect to FIG. 1, there is provided a source of alkaline, hard water connected to a potable water inlet 10. The potable water is supplied at the distribution system pressure to container 16 via line 12 and pre-filtration device 14. Pre-filtration device 14 is required to remove contaminants such as fine suspended particles and residual chemicals that have a detrimental effect on the performance of the RO membrane. Typically, the pre-filter retains particles in the source water greater than 1 or 5 microns in size, and removes organic and chlorinated chemicals with the use of activated carbon. The removal of disinfection chemicals by pre-filter 14 prevents damage to the membrane contained in RO membrane unit 24. Line 12 is provided with a shut-off assembly (not shown) to prevent excess water from entering the water storage container 16. The water in container 16 is stored at atmospheric pressure. Container 16 may be freely vented to the atmosphere through sub-micron seals that prevent the influx of airborne particles and contaminants. A further source of inflow to container 16 is water recycled by the invention via line 52. The feed water for the RO membrane unit 24 is withdrawn from container 16 along line 18.

In the high demand (HD)-mode of operation of the PDS apparatus, the water pressure required to operate RO membrane unit 24 is produced by pressure pump 20 and the RO feed water is supplied via lines 18 and 22. RO permeate from the low-pressure side 26 of the RO membrane unit is removed along line 30 and stored in container 32. RO permeate is stored at atmospheric pressure and a means (not shown) is provided to maintain the volume of stored RO permeate between designated storage limits, and to prevent excess RO permeate from entering the water storage container 32. RO concentrate is removed from the high-pressure side 28 of the RO membrane unit 24 and transferred to pressurized storage vessel 36 via line 34. This hydraulic pathway for the concentrate stream is used during HD- and SD-modes of operation. Pressure vessel 36 also serves as a water storage heater (or hot water tank) for the concentrate section of the PDS apparatus.

Pressurized storage vessel 36 is initialized with RO concentrate water at a desired TDS and pH level (from an earlier RO separation operation) prior to the HD-mode operation of the PDS apparatus. Seed crystal particles of calcium carbonate of a desired quantity and size distribution, are mixed with the initially stored concentrate to provide a required initial TSS concentration of suspended solids.

In HD-mode, the RO concentrate stream from line 34 is mixed with re-circulating concentrate from line 50 and with the seeded concentrate contained in the pressurized storage vessel 36. The composite of mixed concentrate is removed from the pressure vessel 36 by circulation pump 40 along line 38. Circulation pump 40 supplies the concentrate stream containing a crystal particle suspension of calcium carbonate (calcite) to tubular MF membrane unit 44 via line 42. The solid particles are retained in the stream on the high-pressure side 46 of the tubular MF membrane unit and are re-circulated to the pressurized storage vessel 36 via line 50.

In the HD-mode of operation of the PDS apparatus, a high proportion of MF permeate from the low-pressure side 48 of the tubular MF membrane unit is recycled to container 16 via line 52. A high rate of concentrate recycling of MF permeate is produced by the combination of the high pressure boost provided by pump 20 and the high flow re-circulation rate produced by pump 40. The combination of high pressure and high flow in the concentrate loop contributes to the attainment of a high system-efficiency for pressure pump 20 and the RO membrane unit 24. (Specific details of pressure, temperature, flow rate and velocity are provided later in this section, with reference to the detailed description of the PDS control system.) A residual small portion of the tubular MF permeate (that is, precipitated RO concentrate) is discharged via line 54 and mixed with RO permeate from (used soft water) reject lines 70 and 72 prior to discharge via lines 58 and 74 to the drain 76. A low bleed rate of seeded RO concentrate discharge also takes place via line 56. The very low rate of flow in line 56 is calibrated independently from the filtered concentrate discharge via line 54.

The purpose of the concentrate flow in line 56 is to maintain a relatively constant level of suspended solids in the RO concentrate re-circulating stream. The dynamics of the seed-precipitation reaction is influenced by the concentration of crystal solids in suspension. Long-term stabilization of the solids level requires that the amount of crystal solids discharged to line 58 via line 56 should approximately balance the rate of ion transfer to the seed particles.

The actual supply of RO permeate (de-mineralized soft water) is withdrawn from storage container 32 along line 60. The water pressure needed to supply product water for customer use is provided by delivery pump 62. Soft water is supplied directly for cold water use via lines 66 and 70. De-mineralized soft water is also provided for hot and cold-water use. Soft water stored at ambient temperature in tank 32 is delivered directly for cold water use via lines 66 and 70. The soft water stored in tank 32 is also delivered to hot water tank 68 via line 66, to replace stored hot water removed via line 72. (In the United States, hot water tanks are installed and used in over 80 percent of residential plumbing systems to provide a supply of hot water. Storage water heater 68 in FIG. 1 is in most applications a pre-existing fixture, and its normal operation is not changed by the PDS system operation.) Hot soft water is drawn from hot water tank 68 via line 72. The actual operation of "using" RO permeate water is designated in FIG. 1 by the hatched section(s) of the cod water delivery line 70 and the hot water delivery line 72.

During the HD-mode of operation, the soft water effluent from lines 70 and 72 is blended with a small residual discharge of treated RO concentrate from line 58 and directed to drain 76 via line 74. The timing of the discharge of used product water to coincide with the release of small quantities of the precipitated PDS-concentrate stream produces a blended effluent with a TDS that is lower than the originating water supply (excluding TDS contributed by the particular type of use of the soft water.)

Figure 2:
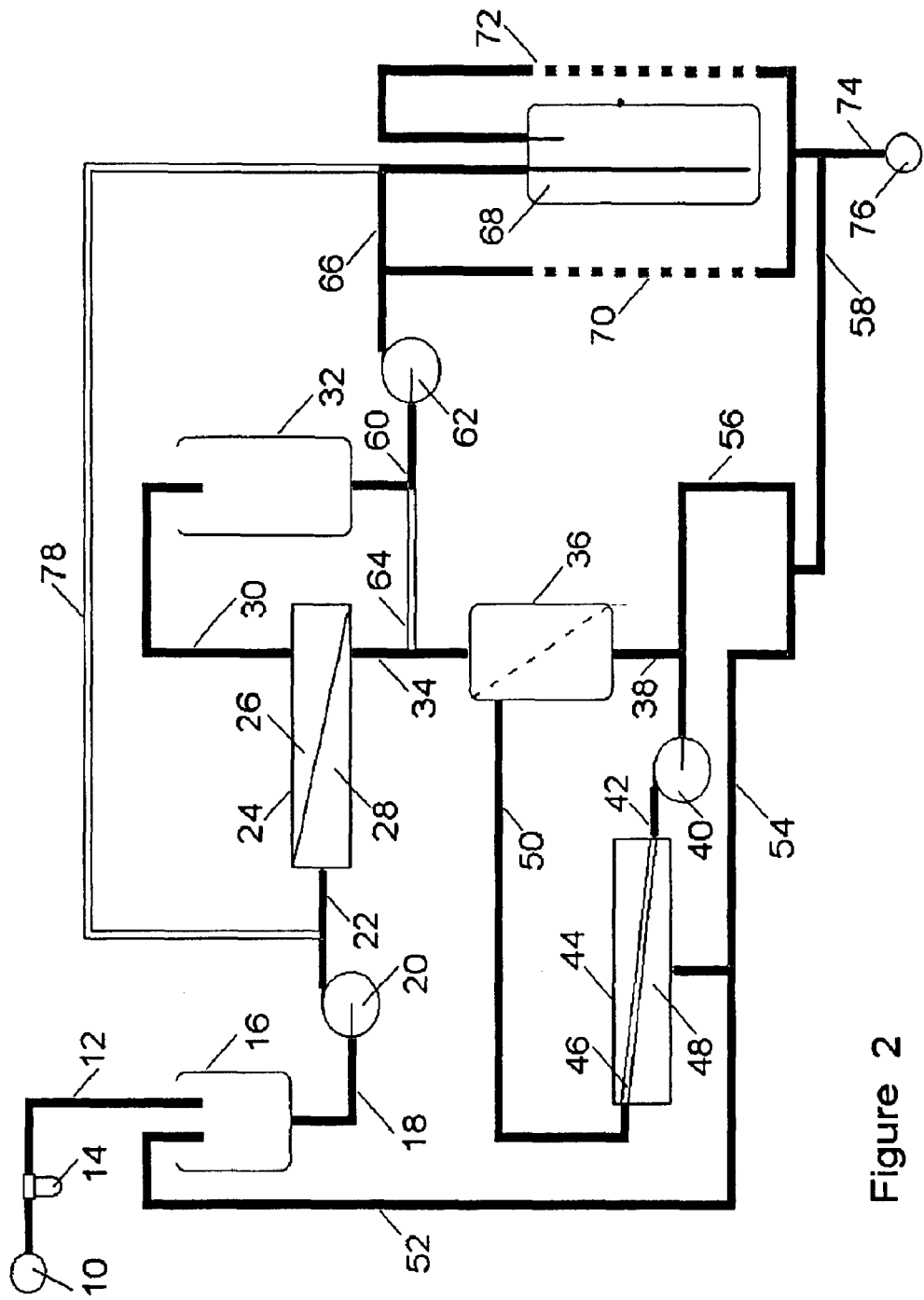
FIG. 2 is a schematic representation of the operation of a PDS system under conditions of high soft water demand (HD-mode operation)
Figure 3:
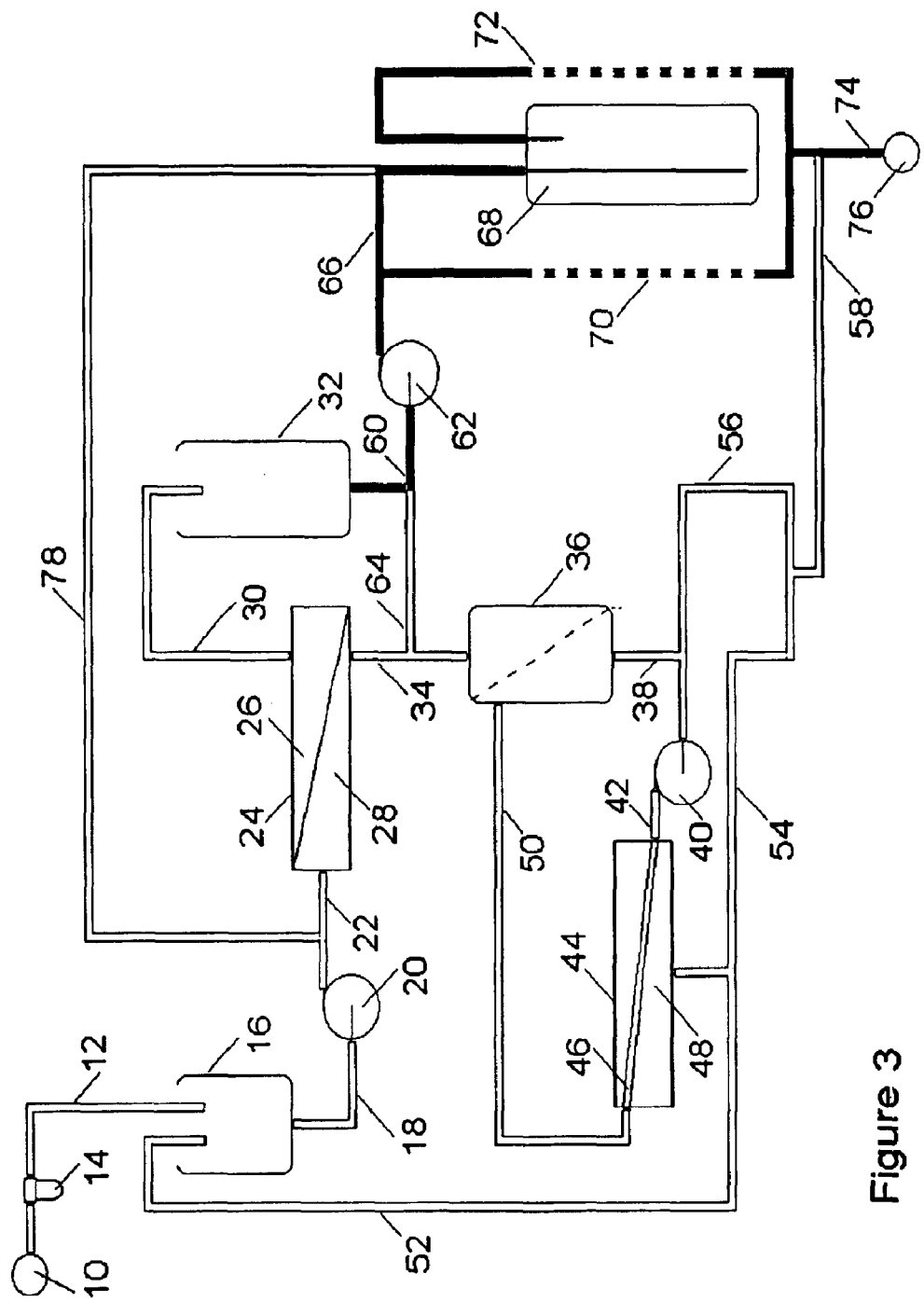
FIG. 3 is a schematic representation of the operation of a PDS system under conditions of low soft water demand (LD-mode operation)
Figure 4:
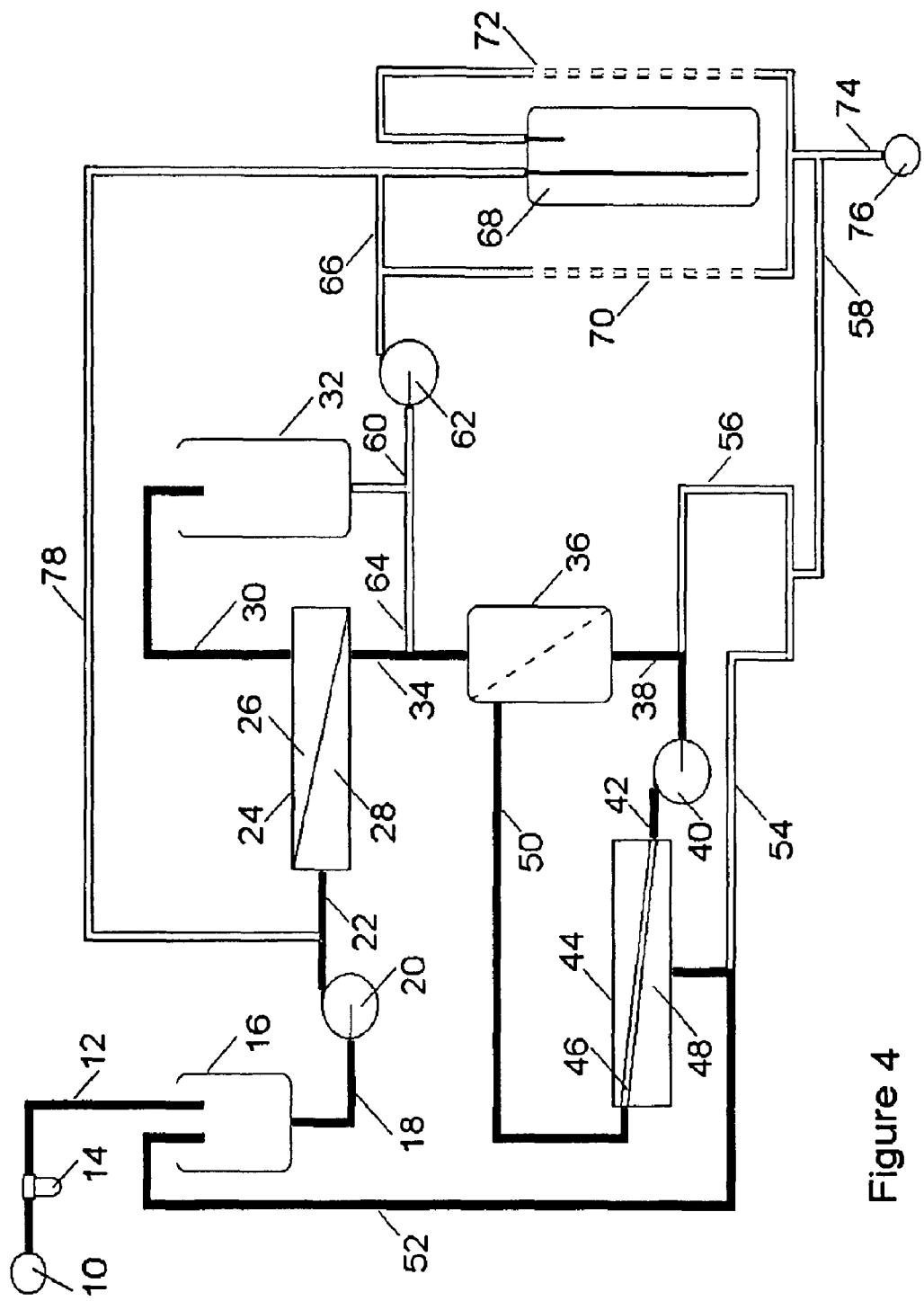
FIG. 4 is a schematic representation of a PDS apparatus during an internal operation to supply soft water to storage (SD-mode operation)

FIGS. 2, 3 and 4 are provided to illustrate the operation of the PDS apparatus in supplying soft water for customer use. In these figures, the active hydraulic pathways for producing, storing and supplying soft water (during HD-, LD- and SD-modes of operation) are indicated as in-filled solid lines. FIG. 2 illustrates the HD-mode of operation of the PDS apparatus during which most of the components of the system are operative. The inflow of source water to the apparatus is provided along line 12, and pressure pump 20, delivery pump 62, and circulation pump 40 are all operated simultaneously. Soft water is drawn from cold permeate tank 32, supplied for hot- and cold-water use, and a blended reduced TDS effluent is discharged to drain 76.

FIG. 3 illustrates the LD-mode of operation of the PDS apparatus. With short-interval soft water demand, stored soft water is withdrawn from cold permeate tank 32, delivered by pump 62 for hot and cold soft water use, and discharged to drain 76. FIG. 4 illustrates the SD-mode of operation of the PDS apparatus. The inflow of source water to the apparatus is provided along line 12, and pressure pump 20 and circulation pump 40 are operated together. RO permeate (soft water) is supplied to cold permeate storage tank 32 until the container is full. There is no discharge from the PDS apparatus during the SD-mode of operation.

Figure 5:
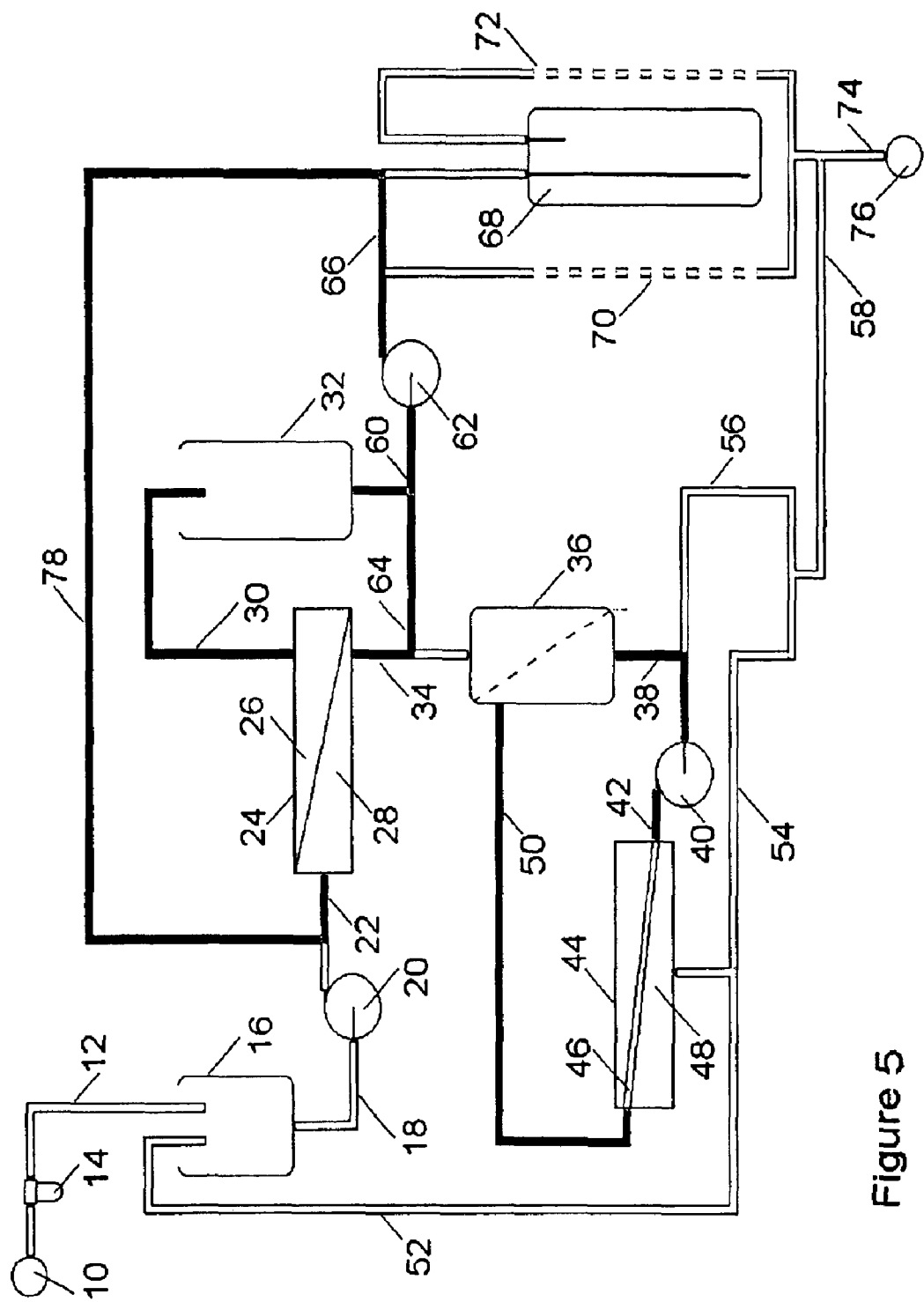
FIG. 5 is a schematic representation of a PDS system during an internal operation that simultaneously carries out RO membrane cleaning with permeate re-circulation (PT-mode operation), and a water conditioning reaction with seeded-concentrate recirculation (CT-mode operation)

Closed-loop operations of the PDS apparatus are illustrated in FIG. 5. Further processing of the water retained in the PDS apparatus following the production and supply of soft water, is carried out in two independent closed-loop operations. RO concentrate is permanently retained in closed storage tank 36, and soft water is continuously stored in cold permeate tank 32 to augment the soft water delivery capability provided by delivery pump 62. The hydraulic pathway used to carry out concentrate re-processing with a CT-mode of PDS operation is used in prior HD- and SD-mode operations (FIGS. 2 and 4.). The hydraulic pathway for the PT-mode operation (FIG. 5) is not used in other modes of system operation. With the use of alternative hydraulic configurations within the PDS apparatus, check valves are required to constrain the flow of water through the apparatus to the paths designated.

With reference to FIG. 5, the re-circulation of concentrate in the CT-mode of operation is carried out with the use of circulation pump 40. The boost pressure provided by pump 40 is low but sufficient to produce a high rate of volume re-circulation of the stored concentrate. The RO concentrate flow path is provided by lines 38, 42, and 50, by the high-pressure path 46 of the tubular MF membrane unit 44, and by pressure tank 36. The operating pressure for concentrate circulation is boosted by the operation of pressure pump 20 only during the HD- and SD-modes of operation. The high-pressure boost provided by the operation of pump 20 is necessary to produce the required MF permeate flux in HD-mode operations. In closed CT-mode operations, MF permeate is not required for recycling to the RO membrane unit.

The means for controlling the duration of the CT-mode operation is provided by monitoring the water temperature in the heated pressure tank 36, and by making the duration of the CT-mode operation dependent upon the temperature conditions in tank 36. (Tank 36 is used, as required, as a heated concentrate storage tank.) The duration of the CT-mode of operation may alternatively be determined on a clock-time basis. More generally, both CT- and PT-modes of operation are carried out simultaneously and are initiated after each HD- or SD-mode of operation has been completed.

In the PT-mode of operation, soft water produced by the prior operation of pump 20 and stored in the cold permeate tank 32, is provided as the feed water for the RO membrane unit 24. The closed loop used to isolate permeate re-processing with a PT-mode of operation is provided by re-circulation line 78. Delivery pump 62 is used instead of pressure pump 20, to provide a pressure increase at the inlet to RO membrane unit 24. The pressure boost from pump 62 is sufficient to provide a low-level flow separation of the stored soft water through the RO membrane unit. Based on the operation of delivery pump 62, the RO membrane unit produces a super-soft permeate (desalted soft water) stream in line 30 and a soft-water concentrate (slightly enriched soft water) stream in line 34. The soft water re-circulation loop from the high-pressure side on RO membrane unit 24 is provided by line 64 which connects the high pressure side of the RO membrane unit 24 to delivery pump 62 via lines 34 and 60. The RO concentrate connection line 64 is used only during the PT-mode of operation. A parallel recirculation connection to pump 62 is also provided from the low-pressure side of RO membrane unit 24 via line 30, the soft water storage in tank 32, and the exit line 60 from storage tank 32.

The purpose of the PT-mode of operation is to provide negative LSI- (Langelier Saturation Index) water for RO membrane cleaning following its earlier contact with super-saturated concentrate during HD- or SD-mode operations. This preventative maintenance process is reviewed in the EXAMPLES section. The PT-mode of operation causes the soft water stored in container 32 to be desalted for a second time by the RO membrane unit 24. The "second pass" RO-concentrate (slightly concentrated soft water) is recombined with a mixed "second pass" RO-permeate (slightly desalted soft water) from storage tank 32 to provide an essentially unaltered original blend of soft water inflow to pump 62. The inflow to pump 62 is then recycled via line 78 to the inlet of RO membrane unit 24.

The PT- and CT-modes of operation provide for and maintain the optimum functioning of the PDS apparatus and, in particular, the RO membrane unit 24. The twin re-circulation of stored RO permeate (de-mineralized soft water) and conditioned RO concentrate, and the carrying out of beneficial concentrate conditioning and membrane maintenance by desalting the stored permeate between periods of soft water production and supply, represents a unique and important aspect of the present invention.

The preferred operation of the PDS system and the maximum flow rates, pressures, temperatures and water quality parameters, are predetermined by virtual prototype analysis and then calibrated to the pH, dissolved mineral content and hardness of the water supply. In the preferred embodiment of the present invention, the PDS apparatus is equipped with a microprocessor-based system that automatically controls the several operations of the system. The control system includes an activation switch that allows the PDS system to be operated manually for system testing and calibration (adjustment) purposes.

The PDS control system is comprised of electronic hardware and software components. For example, a microprocessor (MCP) is mounted on a printed circuit board that interfaces with components such as a terminal board connecting the control system with probes, electrically-operated solenoid valves, and other sensors attached to hydraulic lines, pumps, and storage vessels. The printed circuit board also interfaces with an electrical power supply and with a triac board containing couplings and circuitry for switching pump motors off and on, in accordance with product water demands and the state of the PDS system. The MCP also interfaces with an instrumentation display panel and LED's that indicate the operating status of the PDS system (hydrodynamics, water storage and product quality parameters).

The MCP uses a software program stored in an EPROM (Erasable Programmable Read Only Memory) which is used in conjunction with the control system hardware to control the functions carried out by the PDS apparatus. Expertise is required to design and build a MCP-based control system, and the required knowledge is apparent to those skilled in the art of implementing software and electronic hardware to provide system control functions. Software generally contains routines for initializing, interrupting, and activating timers and internal routines designed to ensure that appropriate functions are utilized.

Software enables the hardware to read input data generated from the apparatus, to interpret the data, and to control the hardware so that it executes various control functions. For example, the software generates signals (1) to check the state of the apparatus and status of the operating system; (2) to initiate new sequences of processing; (3) to modify solenoid valve settings to change the active hydraulic pathways of the system; (4) to turn pump motors on, and to switch them off, when product water supply operations are complete, or when storage vessels are full; (5) and to energize probes to provide data for display of current system conditions.

Several diagnostic control or system- monitoring points are needed to calibrate and optimize the performance of the PDS system. These are illustrated in schematic FIG. 6 that provides, in plan view, a preferred embodiment of the invention. FIG. 6 identifies sensor location points designated 110 through 270. These sensor locations are listed in Table 2 that further indicates the relation of the control/measurement points 110–270 to the numerical identifiers 10–78 representing the PDS system components (Table 1, FIGS. 1–6). Table 2 also shows the system variables and/or parameters that are required for detailed evaluation and/or PDS system testing purposes, as well as the modes of PDS system operation during which the process variables and system status parameters are displayed. FIG. 7 is a schematic of the PDS control system configuration and its component connections to the PDS apparatus.

For the purpose of identifying the proper functioning of the PDS process, key performance indicators are used as follows:

1. The TDS-110 and pH-110 of the water supplied to the apparatus from the municipal water distribution system 10.

These water quality parameters are measured at sensor location 110 in line 12. For residential PDS applications, the rate of water supply inflow would normally be regulated in the range 1.5–2.5 GPM, in keeping with the maintenance of a fairly constant storage level of mixed feed water in RO Header tank 16.

2. The boost pressure P-120, produced by Pressure Pump 20, and needed to supply the RO membrane feed water from header tank 16.

The operating pressure for pump 20 would normally be 70–100 psi, and this would be required during the HD- and SD-modes of PDS system operation. The boost pressure is measured at sensor location 120 in line 22. As previously noted, the boost pressure is independent of the inlet water supply pressure (municipal water distribution system pressure).

3. The pH-150 of the RO concentrate and the rate of concentrate discharge Q-150 from the RO membrane unit 24.

The RO concentrate pH would normally be calibrated in the range 8.5 to 8.7. The flow rate of RO concentrate discharged to storage vessel 36 would normally be in the range 1.0–1.5 GPM. These parameters are measured at sensor location 150 in line 34.

4. The RO permeate- temperature T-140 and the rate of permeate production Q-140 supplied from the RO membrane unit 24.

For residential PDS applications, the permeate production and supply to the permeate storage tank 32 would normally be in the range 1.0–1.5 GPM. The actual temperature of the permeate would depend upon the temperature of the originating water supply and the heat supplied to pressurized storage vessel 36. The permeate would normally be produced with a temperature of about 80 degrees Fahrenheit, and the stored permeate temperature would be expected to fluctuate slightly above the normal ambient temperature. These parameters are measured at sensor location 140 in line 40.

5. The TDS-270 of the stored permeate.

The permeate- TDS would normally be 40–50 mg/L based on Colorado River Aqueduct source water (570–620 mg/L TDS and 16-grain water hardness). The permeate- TDS is measured at sensor location 270 in storage vessel 32.

6. The temperature T-260 of the concentrate stored in pressure vessel 36.

The stored concentrate would normally be heated to about 104 degrees Fahrenheit. The stored concentrate temperature would, at times, be expected to fluctuate to as low as about 90 degrees Fahrenheit during HD- and SD-mode permeate- production operations of 5–10 minutes- duration or more. This fluctuation in stored concentrate temperature results from the mixing of heated concentrate with RO concentrate supplied from colder RO feed water. The stored concentrate temperature is measured at sensor location 260 in storage vessel 36.

More generally, it is useful to identify the influence of individual processes contributing to the overall performance of the PDS system. Such determinations would be obtained from measurements of specific conditions in other parts of the PDS apparatus. For example, refinements to the PDS system operation could be made as a result of monitoring and then modifying the operation of Pressure Pump 20, Circulation Pump 40 or Delivery Pump 62. Experimental testing with the PDS apparatus may also be necessary (1) to improve individual process efficiencies (hydrodynamic mixing for seed precipitation), and (2) to examine process time dependencies (involving the suspended seed precipitation reaction and the quasi-equilibrium of the "dynamic membrane" formed in the tubular MF membrane unit 44). For these investigations and other laboratory determinations, it would be advantageous to monitor or display additional PDS system indicators as followings:

7. The boost pressure P-170 produced by Circulation Pump 40, and resulting rate of concentrate removal Q-170 from the pressure vessel 36.

The operating pressure for pump 40 would depend upon the mode of operation of PDS system. In HD- and SD-modes, the operating pressure would be in the range 70–100 psi, whereas during the CT-mode of PDS system operation, the operating pressure would be in the range 5–10 psi. Regardless of the operating mode, the rate of concentrate recirculation would normally be maintained in the 5–7 GPM range. The Circulation Pump operating pressure and discharge are measured at sensor location 170 in line 42.

8. The boost pressure P-220 produced by Demand Pump 62 to supply the permeate demand Q-220 from the permeate-storage tank 32.

The operating pressure for pump 62 would depend upon the (variable) rate of soft water demand, that is, the required permeate supply rate. The operating boost pressure for Demand Pump 62 would normally be in the range 20–70 psi during HD-, LD- and PT-modes of system operation. The permeate- delivery rate would normally be in the range 2–4 GPM. The Demand Pump operating pressure and discharge are measured at sensor location 220 in line 66.

9. The TDS-200 of the particle-free recycled permeate from tubular MF unit 44 and the recycled concentrate flow rate Q-200 to the RO header tank 16.

The recycle rate of MF permeate would normally be regulated in the range 0.75–1.25 GPM. These parameters are measured at sensor location 200 in line 52.

10. The total suspended crystal solids content TSS-190 of the seeded concentrate in pressure vessel 36 and the solids balance of the seeded concentrate circulated through line 50.

The water sample required for the measurement of Total Suspended Solids (TSS) is obtained via a sample valve at sensor location 190 in line 50.

Particular PDS system component specifications and process requirements are required for the operational integration of the dynamics of the seed precipitation reaction for the demineralization of both the concentrate and permeate streams.

The practicality of carrying out a controlled, timely and efficient removal of dissolved calcium hardness by anhydrous precipitation is enhanced by the use of a suspension (slurry) of seed crystal particles of calcium carbonate selected from within a narrow micron size range. Mineral Technologies, Inc. of New York, N.Y. is a technology-based organization that develops and produces performance-enhancing minerals. Its subsidiary, Specialty Minerals, Inc., is a producer and supplier of synthetic mineral products of controlled particle size, such as precipitated calcium carbonate (PCC). PCC is suitable for use in the PDS system. Alternatively, Specialty Minerals, Inc. of Lucerne Valley, Calif. supplies a range of fine-ground calcium limestone products suitable for application with the PDS apparatus.

The specification and component requirements for the membrane-based processes, and, in particular, the virtual prototype performance of the RO membrane unit, has been based upon operational and design information for (Thin Film Composite) TFC Spiral-Wound Reverse Osmosis TFC 4921S Polyamide Softening Membrane Elements, which are produced for various standard sizes. The residential-scale PDS apparatus of the present invention requires standard elements of 2.5 inch diameter and 40 inch length. Three to five of such elements were configured in series as the RO membrane unit 24. Polyamide membrane is manufactured by Koch Membrane Systems, Inc. of San Diego, Calif. and 2540 membrane elements and housings are produced by RO UltraTec USA, Inc. of Fallbrook, Calif.

The PDS system operation has further been based on operational and design information for an asymmetrical polymeric semi-permeable MF membrane of PVDF (KYNAR.RTM) having a pore size of 0.1 to 0.2 microns. Such tubular MF membrane element is required for MF membrane unit 44. The tubular PVDF membrane is operated at pressures of greater than 60 psi, and is supported by a tube of sintered polyethylene (HDPE) material. Such tubular MF membranes are available from U.S. Filter Corporation, Billerica, Mass., under the trademark "MP5." The characteristics of this MF membrane are illustrated in prior art reference U.S. Pat. No. 6,270,671.

Rotary vane pump/motors suitable for Pressure Boost Pump 20 are widely available from industrial component suppliers, for example, under the trade name Fluid-O-Tech (Models PA-70/80/90). Circulation pump/motors suitable for Circulation Pump 40 are available from Laing Thermotech, Inc., (Model SM-909-B26) of San Diego, Calif. Pump/motors suitable for Delivery Pump 62 are available from Aquatec Water Systems, Inc. (Series 550 Models) of Irvine, Calif.

ROU UltraTec USA, Inc. is a supplier of standard membrane system components (pre-filters, housings, pumps, motors, storage tanks, meters, valves, gauges, and accessories) needed to assemble and operate the PDS apparatus. PDS Monitoring and System control components (electronics, electrically-operated system control devices) and the expertise required to implement an a microprocessor (MCP)-based control system for the PDS apparatus, are obtainable from Aquatec Water Systems, Inc. of Irvine, Calif. and Cadent Technologies, Inc. of Temecula, Calif.

Conclusions and Ramifications

Based upon (1) the results of virtual prototype testing of the parallel desalting process; (2) the analysis of a broad range of water quality data representative of hard, alkaline well water supplies in California; and (3) experimental results and published scientific information on the kinetics of crystallization of calcite in natural bicarbonate solutions, it may reasonably be concluded that an efficient hybrid membrane softening process may be constructed in a manner that integrates a number of component processes and system technology considerations:

1. The raising of solution pH by passing feed water through a RO membrane unit to provide the means and conditions necessary to remove calcium hardness from a concentrate stream.

2. The addition of solid crystal particles of calcium carbonate to a particle-free, supersaturated concentrate stream to provide a means to develop a controlled, timely and efficient removal of dissolved calcium hardness from a concentrate stream.

3. The carrying out of an efficient post-RO membrane-softening seed-precipitation reaction in a concentrate steam to produce a means to reduce the pH of a concentrate stream prior to its recycling as filtered MF permeate feeding a RO membrane unit.

4. The incorporation of a processing sequence of, first, raising the pH of a concentrate stream by RO membrane separation, and then reducing the pH of a concentrate stream by seed precipitation in a re-circulating flow configuration, in order to induce a cycling of concentrate pH within a hybrid membrane softening system. The internal cycling of pH within the apparatus contributes to a high level of system recovery of a membrane softening operation without requiring the extraneous use of chemical reagents.

5. The use of the "post-RO" precipitation process eliminates the need to add pH-adjusting chemicals as a pre-treatment operation to the source water that feeds the RO membrane-softening unit.

6. The use of a tubular MF membrane unit to filter a large portion of a seeded concentrate for recycle as a particle-free concentrate to a RO membrane unit.

7. The operational integration of the dynamics of the seed precipitation reaction in a RO concentrate stream and the efficient operation of a RO membrane unit, which is obtained by alternating the patterns of flow in a sequence of open, production/supply operations and closed, system conditioning and membrane cleaning operations.

8. The optimization of the operation of the hybrid membrane softening process which is accomplished by (1) calibrating the RO membrane operation to produce the desired pH of the concentrate stream, and by (2) maintaining the process of recycling seeded concentrate within a closed recirculation loop in accordance with the dynamics of a seed precipitation reaction and the need to reduce the stored solution pH in the seeded concentrate section of the apparatus.

9. The carrying out of an efficient seed precipitation reaction within a metastable range by means of seeding a concentrate stream with micron-sized crystals particles and by the use of elevated water temperatures, which are provided by a heated concentrate mixing tank.

10. The use of an operating control system for a hybrid membrane softening system that continuously monitors the conditions of the aqueous solution circulating within the system and balances the operation of the RO membrane unit and the tubular MF membrane unit. This system provides an efficient means for supplying soft water on a periodic basis.

The application of parallel desalting (PDS) to supply soft water on an intermittent or interrupted demand basis makes it possible to carry out useful recuperative operations during non-supply periods in both the seeded and particle-free sections of the apparatus. In particular, intermittent demand provides the opportunity to "re-initialize" the PDS system, that is, recondition the concentrate stored within the apparatus and carry out preventative maintenance operations by re-processing stored permeate through the RO membrane unit in a closed low-pressure operation. In essence, the RO membrane cleaning operation is carried out by 'desalting the permeate.'

The PDS system is responsive to the pattern of soft water demand which, for example in residential applications, may require a continuous supply of demineralized product water for periods of 15 to 20 minutes or more at one time. The PDS system can operate effectively under the constraints of residential plumbing codes. The means to sustain soft water supply at the desired maximum rate may be provided by system-storage-capacity or by other operational means. More generally, duplicate, parallel or multiple components of the PDS apparatus may be provided in order to maintain soft water supply on a virtually continuous basis. Parallel desalting provides industrial strength technology to service residential soft water demand in a conservative, environmentally sensitive and socially responsible manner.

EXAMPLES

The Examples illustrate several important functions and capabilities of the method and apparatus for parallel desalting (PDS). The results have been developed from virtual prototype analyses of a residential PDS system, and the basis for integrating the processes of the PDS method is supported by published scientific research results and data. The Examples represent the performance of a pilot-scale PDS system, and it is anticipated that similar results will be demonstrated in laboratory testing and field investigations.

Example 1

Solution pH is an important process variable, and is a major consideration for the integration and optimization of the performance of the PDS system. Example 1 illustrates the use of membrane separation to establish the target pH levels in a RO concentrate stream that are conducive to the metastable precipitation of calcium carbonate on to seed crystals. The mixing of supersaturated concentrate with a suspension of seed particles in a precipitated concentrate solution is an essential means for recycling a reduced pH concentrate back to a RO membrane unit. A tubular MF (wastewater) membrane is situated downstream of a potable-water RO membrane to strictly deal with the processing of TDS and water hardness (salinity). The water introduced to the PDS apparatus is of potable water quality, and it is further pretreated to remove suspended micron-sized particles and oxidizing constituents prior to RO membrane treatment. The wastewater membrane is needed because the RO concentrate is mixed and circulated with seeded concentrate. The seed particles must be separated from the concentrate solution in a subsequent MF treatment step in order to recycle particle-free precipitated concentrate back to the RO unit.

A 'cycling of the aqueous solution pH' from the pH of the RO feed water (a mixture of source water and recycled concentrate) to the pH of the RO concentrate; and from the pH of the RO concentrate to the pH of the recycled concentrate is illustrated for (1) a Membrane Softening (MS) system operation and (2) a 'hybrid' membrane softening operation as represented by the present invention.

The influent stream is separated by the operation of a RO membrane unit to produce a permeate (pt) stream and a concentrate (ct) stream. A comparison is provided to show the operational and chemical means by which membrane softening (MS) and parallel desalting (PDS) processes can produce permeate flows equal in volume terms to 70, 75 and 90 percent of the source water supply. MS system recoveries of 70 to 75 percent are representative of industrial MS performance with brackish source water. Example 1 is based upon the supply of pH 8.1 potable water to a MS operation. This water is characterized as hard and alkaline. Data are first provided for MS70 and MS75 operations that produce 30 and 25 percent brine discharges. The concentrate recycle streams have a pH's of 8.57 to 8.63, respectively;

|  |  | MS70 | | M575 | |
| --- | --- | --- | --- | --- | --- |
| OPERATION | Source | pt | ct | pt | ct |
| System Recovery (%) |  | 70 | 70 | 75 | 75 |
| Array Recovery (%) |  | 60 | 60 | 60 | 60 |
| Recycle (%) |  | 00 | 35 | 00 | 50 |
| TDS (mg/L) | 567 | 40 | 1785 | 48 | 2127 |
| Hardness (mg/L as CaCO3) | 274 | 7.1 | 891 | 8.6 | 1072 |
| pH | 8.10 | 7.32 | 8.57 | 7.39 | 8.63 |

The MS70 and MS75 operations are obtained with concentrate recycle levels of 35 and 50 percent, respectively. The remainder of the concentrate is discharged. The concentrate recycling would have to be increased to 84 percent for a MS90 operation, that would discharge a brine stream equal to 10 percent of the source water supplied. The MS90 operation would raise the pH of RO recycle concentrate stream to 8.90. As a result, this MS90 operation would probably not be sustainable because of the high pH. However, with acid pre-treatment of the feed water, the RO concentrate pH in a MS90 operation could be reduced to levels similar to those produced with MS70 or MS75 operations, that is, reduced to a RO concentrate pH in the range 8.57 to 8.63. Such pre-treatment would be accomplished in a MS operation with the addition of acid reagent to the RO feed tank. Based upon a 2:1 ratio of source water to the recycled pH 8.90 concentrate, the pH of the feed water in a MS90 operation without acidification, would be about 8.54. In comparison, the pH the feed water in the MS70 and MS75 operations would be 8.22 and 8.28.

With a parallel desalting (PDS) system, and in contrast with a MS system, the concentrate is softened by seed precipitation and therefore recycled at a reduced alkalinity, back to the RO separation unit. The resulting lowering of feed pH within the PDS apparatus suppresses the deposition of solids on to membrane surfaces while providing for improved system recovery. With a PDS90 operation, the required amount of pH adjustment for the feed water would be induced by the seed precipitation of precipitated calcium carbonate (PCC). The preferred amount of pH adjustment would normally be about minus 0.3 but could be increased to minus 0.6 or more.

Based upon the natural alkalinity of the source water for Example 1 and the concentration factor produced in the RO unit, the precipitation reaction dynamics in the concentrate stream would probably not sustain a continuous PDS90 operation. That is, the precipitation reaction would probably not be efficient or fast enough to maintain the reduced RO concentrate pH at the necessary level.

With short-term supply operations, however, the problem of slow water softening in the concentrate stream can be resolved without the use of external chemical adjustment. In this case, intermittent soft water demand can be supplied with a interrupted operation of the RO membrane unit. Residential demand for softened water, for example, generally occurs on an intermittent basis. Therefore, with a residential PDS application, it can be assumed that a PDS apparatus could supply the necessary de-mineralized permeate on an intermittent basis, in response to the soft water demand. In order to accomplish this, a volume of stored RO concentrate must be retained within the PDS apparatus prior to the execution of any PDS supply operation. The pH of the stored concentrate is conditioned (to a lower pH) by the execution of an extended seed precipitation reaction. This is carried out prior to and independently from the PDS soft water supply operation. In accordance with the present invention, the PDS apparatus would be operated in a sequence of conditioning and supply modes.

In a PDS90 supply operation, pre-conditioning of stored concentrate is necessary to sustain a RO concentrate pH in the preferred range, 8;58 to 8.63. With a PDS90 supply operation, the stored concentrate pH would have to be initialized within the range 8.40 to 8.50 by extended seed precipitation. With an appropriate selection of PCC seed crystals, the time required to condition a stored concentrate pH in a PDS operation from a pH of 8.63 to 8.50 is estimated to be about 5 minutes. Similarly, the time required to condition a stored concentrate pH from a pH of 8.58 to 8.40 is estimated to be about 10 minutes. With these initialized lower pH levels for the stored seeded concentrate solution, the recycle stream during a PDS90 supply operation would lead to the raising of the RO concentrate pH to the range 8.57 to 8.63. By comparison, an 84 percent recycling of the non-conditioned concentrate in a MS-90 operation would result in the continuous production and recycling of pH 8.90 concentrate. The operational and chemical data for the MS90 and PDS90 operations are given below. The data for the PDS90 operation apply to a pre-conditioning pH level of 8.40 in the stored concentrate prior to the supply operation. With a short-term soft water supply operation of up to 20 minutes or more, the pH of the recycled (particle-free) concentrate would be expected to stabilize in the range 8.40 to 8.50 throughout the supply period. The final steady state level would depend upon the rate of concentrate flow and the storage capacity of the concentrate tank.

| OPERATION | Source | MS90 pt | MS90 ct | PDS90 pt | PDS90 ct |
|---|---|---|---|---|---|
| System Recovery (%) | | 90 | 90 | 90 | 90 |
| Array Recovery (%) | | 60 | 60 | 60 | 60 |
| Recycle (%) | | 00 | 84 | 00 | 84 |
| TDS (mg/L) | 567 | 105 | 4756 | 90 | 4374 |
| Hardness (mg/L as CaCO3) | 274 | 22.5 | 2556 | 16.2 | 2169 |
| pH | 8.10 | 7.72 | 8.90 | 7.44 | 8.58 |
| Recycle pH | | | 8.90 | | 8.40 |

The PDS90 operation would provide a sustained desalting benefit in the effluent stream (evidenced by the reduced concentrate TDS produced by the crystal solids transfer reaction). In contrast, the MS90 operation would probably not be sustainable with the higher pH of 8.90, at a 90 percent level of system recovery. Furthermore, the MS90 operation would not produce a desalting benefit in the MS system effluent stream.

Example 2

The influence of the precipitation reaction dynamics on the attainment of desired pH levels for the seeded concentrate solution, and the stabilization of the pH during the PDS soft water supply operation, are examined in Example 2. This example illustrates the exponential rate of decline of the PCC reaction (seed precipitation of calcium carbonate) with reduced pH and alkalinity. As the precipitation reaction proceeds, and as the pH of the precipitated concentrate solution falls, an increasing amount of conditioning time is required to reduce the retained concentrate to a lower target pH level. In Example 2, the PDS90 operation is based on a pH 8.1 supply of hard alkaline water, and a 84 percent recycling of precipitated concentrate. The concentrate is conditioned for longer periods of time to achieve increasingly lower levels of calcium hardness and increasingly lower re-initialed pH levels for the stored concentrate. The duration required for the extended conditioning of the concentrate stored in the PDS apparatus is tabulated below.

In Example 2, a seed precipitation reaction is used to provide recycled concentrate pH adjustments from minus 0.05 to minus 0.35. The required duration of the seed precipitation reaction, and the rate of reduction of solution pH, depends upon the crystal seed properties, hydrodynamic factors, and activation levels (temperature). Data are provided for solution temperatures of about 35 degrees Celcius. Thus, the recycling of RO concentrate at pH 8.70, and the mixing of MF permeate stream with source water in the ratio 1:2, would produce a RO concentrate at pH 8.75. The time needed for the seed precipitation reaction to cause the solution pH to decline from pH 8.75 to pH 8.70 is about 45 seconds. At the lower range of practicality, the recycling of RO concentrate at pH 8.10, and the mixing of MF permeate stream with source water in the ratio 1:2, would produce a RO concentrate at pH 8.45. The time needed for the seed precipitation reaction to cause the solution pH to decline from pH 8.45 to pH 8.10 is about 30 minutes.

| Delta pH | −0.05 | −0.09 | −0.13 | −0.18 | −0.23 | −0.29 | −0.35 |
|---|---|---|---|---|---|---|---|
| CT Recycle pH | 8.70 | 8.60 | 8.50 | 8.40 | 8.30 | 8.20 | 8.10 |
| CT RO pH | 8.75 | 8.69 | 8.63 | 8.58 | 8.53 | 8.49 | 8.45 |
| Precipitation time | 45 sec. | 2 min. | 4.6 min. | 11.0 min. | 12.5 min. | 23.7 min. | 29.4 min. |

The variation in stored concentrate conditioning and the reduction in calcium hardness in the recycled concentrate stream produces a range of product water and effluent water desalting benefits. These are tabulated below for steady state conditions, based upon source water TDS of 567 mg/L and Hardness 274 mg/L (as Calcium Carbonate):

| | | | | | | | |
|---|---|---|---|---|---|---|---|
| CT Recycle pH | 8.70 | 8.60 | 8.50 | 8.40 | 8.30 | 8.20 | 8.10 |
| CT RO pH | 8.75 | 8.69 | 8.63 | 8.58 | 8.53 | 8.49 | 8.45 |
| Effluent TDS (mg/L) | 531 | 521 | 511 | 504 | 498 | 493 | 489 |
| TDS reduction (mg/L) | 36 | 47 | 56 | 63 | 69 | 74 | 77 |
| Effluent Hardness (mg/L as CaCO3) | 245 | 235 | 227 | 221 | 216 | 212 | 209 |
| Effluent Hardness reduction | 29 | 39 | 47 | 53 | 58 | 62 | 65 |
| Effluent pH | 7.94 | 7.85 | 7.78 | 7.66 | 7.63 | 1.60 | 7.48 |

Example 3

The adaptability of the PDS method and apparatus in producing de-mineralized soft water from hard, alkaline water was further investigated using source water supplied from local (Southern California) groundwater supplies. Table EX3 provides water quality representative of Southern California water, their constituent ion concentrations, and the ion concentrations expected for PDS product water. Commonly dissolved minerals impart a definite taste to groundwaters and surface waters used for community supply. The PDS system has the capability to transform highly mineralized drinking water into water of the highest aesthetic and perceptual quality. This premium quality for drinking water is found naturally in mountain headwater streams and lakes (Lake Tahoe, Arrowhead Lake, and the uppermost reaches of the Colorado River.)

Detailed surveys of perceptual quality of drinking water supplied to the main urban centers in California have shown that when this premium grade of water is supplied, customers provide a 100 percent rating of consumer satisfaction, with 75 percent providing an excellent rating. In contrast, highly mineralized drinking water produces up to 45 percent unsatisfactory ratings. The mineral quality of product water supplied by the PDS system from Colorado River Aqueduct water fall within the "Excellent" water grade. This quality is defined as less than 60 to 70 mg/L TDS.

The attainment of the PDS target for product water quality (70 mg/L TDS) must, however, be qualified to include efficiency ratings with which product water is produced. On this basis, anticipated performance of the PDS system using TFC ULP4821 RO membrane elements with MWD imported water is expected to be less than about 50 mg/L TDS, with system recoveries (conversion of source water to product water) in the range 80 to 90 percent.

When processing lower TDS groundwater (350–450 mg/L) with higher alkalinity and pH in the range 8.30 to 8.40, the PDS product water with likely fall within the range 25–45 mg/L TDS. However, in this case, the efficiency of the PDS system (water recovery) may have to be limited to the 80–85 percent range. This level of water recovery would still significantly exceed the water recoveries achieved by conventional membrane softening systems that are usually in the range 70–75 percent.

TABLE EX3

Target and Potential Parallel Desalting (PDS) Water Quality

| Parameter | Application Range | MWD | PDS System Target (headwater quality) | PDS System Potential |
|---|---|---|---|---|
| TDS | 200–900 | 570 | 70 | 20–50 |
| HDS | 120–450 | 270 | 50 | 10 |
| Ca++ | 20–140 | 70 | 15 | 2 |
| Mg++ | 15–35 | 25 | 3 | 1 |
| Na+ | 25–120 | 90 | 15 | 15 |
| K+ | 1–7 | 4 | 1 | 1 |
| HCO3– | 50–270 | 140 | 50 | 15 |
| SO4= | 10–320 | 230 | 10 | 10 |
| Cl– | 20–105 | 90 | 20 | 15 |
| NO3– | 1–80 | 5 | 2 | 2 |
| pH | 7.0–8.5 | 8.1 | 7.6 | 7.0–7.5 |

Example 4

In the PT-mode of operation of the PDS system, soft water stored in the cold permeate tank is provided as the feed water for the RO membrane unit. In this internal maintenance mode of operation, the delivery pump is used to provide a pressure increase at the inlet to RO membrane unit. The pressure boost from the delivery pump is sufficient to provide a flow separation of the stored soft water through the RO membrane unit. The PT-mode of operation causes the soft water stored in cold permeate tank to be desalted for a second time by the RO membrane unit. Based on the operation of delivery pump, the RO membrane unit produces a super-soft permeate (desalted soft water) stream and a soft-water concentrate (slightly enriched soft water). In residential applications, the "second pass" RO-concentrate (slightly concentrated soft water) is normally recombined with a mixed "second pass" RO-permeate (slightly desalted soft water) from storage tank to provide an essentially unaltered original blend of soft water inflow to pump.

In commercial applications, a further option exists to separately store the "second-pass" RO-permeate for direct use in boiler water applications. Based on imported Colorado River Aqueduct water supplied by MWD of Southern California and distributed with a 550–620 mg/L TDS, the PDS system produces product water with <50 mg/L TDS. This PDS product water salinity includes a calcium ion concentration of 3.0 mg/L and a magnesium ion concentration of 1.1 mg/L. This level of water hardness might be somewhat excessive as boiler water. Based upon the PT-operation of the delivery pump with a pressure boost of between 45 and 70 psi, the second pass RO permeate can be reduced to a TDS of between 1.8 and 2.7 mg/L. This super permeate includes a calcium ion concentration of 0.03–0.04 mg/L and a magnesium ion concentration of 0.01–0.02 mg/L. This second pass water could be preferably used as premium boiler water.

Although there has been hereinabove described a specific embodiment in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element that is not specifically disclosed herein. Accordingly, any and all modifications, variations or equivalent arrangements which may occur to those skilled in the art, should be considered to be within the scope of the present invention as defined in the appended claims:

TABLE 1

PDS SYSTEM COMPONENT IDENTIFICATION

| Numeral | Description of PDS System Components (FIGS. 1–5) |
|---|---|
| 10 | Originating water supply |
| 12 | Line (Water Supply - RO header) |
| 14 | Pre-filter |
| 16 | RO Header Tank |
| 18 | Line (RO Header tank to HD-mode pressure pump) |
| 20 | HD-mode Pressure Pump |
| 22 | Line (HD-mode pressure pump to RO Membrane unit) |
| 24 | RO membrane Unit |
| 26 | Low-pressure (l/p) side of RO unit |
| 28 | High-pressure (h/p) side of RO unit |
| 30 | Line (RO unit to PT storage tank) |
| 32 | Permeate (PT) storage tank |
| 34 | Line (l/p RO unit to CT storage tank) |
| 36 | Concentrate (CT) storage tank |
| 38 | Line (CT storage tank to CT circulation pump) |
| 40 | CT Circulation pump |
| 42 | Line (CT circulation pump to MF unit) |
| 44 | Tubular MF membrane unit |
| 46 | high-pressure side of MF unit |

TABLE 1-continued

PDS SYSTEM COMPONENT IDENTIFICATION

| Numeral | Description of PDS System Components (FIGS. 1–5) |
|---|---|
| 48 | low-pressure side of MF unit |
| 50 | Line (h/p MF unit to CT storage tank) |
| 52 | Line (l/p MF unit to RO header tank) |
| 54 | Line (l/p MF unit to CT mixing line 58) |
| 56 | Line (CT storage tank to CT mixing line 58) |
| 58 | Line (CT mixing line to PT effluent mixing line) |
| 60 | Line (PT storage tank to PT delivery pump) |
| 62 | Permeate (PT) Delivery pump |
| 64 | Line (PT-mode return to PT delivery pump) |
| 66 | Line (PT delivery pump to hot water tank and cold outlet line) |
| 68 | Domestic Hot water tank |
| 70 | Line (PT cold water outlet) |
| 72 | Line (PT hot water outlet) |
| 74 | Line (Permeate effluent mixing line) |
| 76 | Effluent collection and discharge |
| 78 | Line (PT Delivery pump recirculation to RO membrane unit) |

TABLE 2

PDS CONTROL AND MONITORING SYSTEM REQUIREMENTS

| | DESCRIPTION OF PDS COMPONENT OR OPERATING VARIABLE | PDS SENSOR IDENTIFICATION | ASSOCIATED PDS COMPONENT IDENTIFICATION | ACTIVE OPERATING MODES | MEASUREMENT OR CONTROL FUNCTION | HYDRAULIC CONTROL DEVICE |
|---|---|---|---|---|---|---|
| #1 | Water Supply Inlet | 110 | 10, 12 | HS/SD | WQ, Q, T, P | R, S |
| #2 | Booster Pump | 120 | 20, 22 | HD/SD | WQ, Q, T, P | N |
| | RO Membrane Feed | 130 | 22 | HD/SD/PT | | R, S |
| #4 | RO Permeate | 140 | 30 | HD/SD/PT | WQ, Q, T, P | R |
| #3 | RO Concentrate | 150 | 34 | HD/SD | WQ, Q | R, S |
| | RO Concentrate | 160 | 64 | PT | | N, R, S |
| #7 | Circulation Pump | 170 | 40, 38 | HD/SD/CT | WQ, Q, P | |
| | Concentrate solids balance | 180 | 56 | HD | Q | R, S |
| #10 | Seeded Concentrate TSS | 190 | 50 | HD/SD/CT | WQ | R |
| #9 | MF Permeate Recycle | 200 | 52 | HD/SD | WQ, Q, P | R, S |
| | MF Permeate Discharge | 210 | 54 | HD | Q | R, S |
| #8 | Delivery Pump | 220 | 62, 60 | HD/LD/PT | WQ, Q, T, P | |
| | Water Use | 230 | 66 | HD/LD | WQ, Q | |
| | Permeate Recycling | 240 | 78 | CT | | N, R, S |
| | RO Header Tank | 250 | 16, 18 | HD/SD | H | |
| #6 | Concentrate Temperature | 260 | 36, 38 | HD/SD/CT | T, P | |
| #5 | Product Storage | 270 | 32, 60 | HD/LD/SD/PT | H | |

| | DESCRIPTION OF PDS COMPONENT OR OPERATING VARIABLE | PDS STATUS DISPLAY | H2O QUALITY DISPLAY | H2O QUALITY SAMPLE |
|---|---|---|---|---|
| #1 | Water Supply Inlet | | TDS, pH | |
| #2 | Booster Pump | P | | |
| | RO Membrane Feed | | | |
| #4 | RO Permeate | Q, T, P | | |
| #3 | RO Concentrate | Q | pH | |
| | RO Concentrate | | | |
| #7 | Circulation Pump | Q | | |
| | Concentrate solids balance | | | |
| #10 | Seeded Concentrate TSS | | | TSS |
| #9 | MF Permeate Recycle | Q | TDS | |
| | MF Permeate Discharge | | | |
| #8 | Delivery Pump | Q | | |
| | Water Use | | | |
| | Permeate Recycling | | | |
| | RO Header Tank | | | |

TABLE 2-continued

PDS CONTROL AND MONITORING SYSTEM REQUIREMENTS

| | | | | |
|---|---|---|---|---|
| #6 | Concentrate Temperature | T | | |
| #5 | Product Storage | | | TDS |

LEGEND
(bold)** Primary Control AND Data Display
SYSTEM PARAMETERS
WQ Water Quality (TDS, TSS, pH)
Q Flow (GPM)
T Temperature Display/Control
P Pressure Display/Control
S Solenoid Valve
N Non-Return Valve
R Regulating Valve
H Storage Tank Level

What is claimed is:

1. Apparatus for membrane softening of potable water, said apparatus comprising:
   a reverse osmosis (RO) membrane for softening and demineralizing potable water, said reverse osmosis (RO) membrane producing an (RO) permeate and an (RO) concentrate;
   a microfiltration (MF) membrane for receiving the (RO) concentrate and producing an (MF) permeate and (MF) concentrate;
   hydraulic pathways for recycling the (MF) permeate to the potable water for return to said reverse osmosis (RO) membrane at a pH level suitable for suppressing deposition of solids on the reverse osmosis (RO) membrane;
   a pressurized concentrate storage tank including initially disposed seed crystals, the storage tank being in fluid communication between the reverse osmosis (RO) membrane and the microfiltration (MF) membrane for receiving (RO) concentrate at a pH that is conducive to metastable precipitation of calcium carbonate on the seed crystals; and
   lines for delivery of (RO) permeate for use.

2. The apparatus according to claim 1 wherein said hydraulic pathways comprise a permeate storage tank interconnected between the (RO) membrane and the delivery lines.

3. The apparatus according to claim 2 further comprising a permeate delivery pump for both providing water pressure to the delivery lines and for recirculation of (RO) permeate through the (RO) membrane for cleaning thereof, a recirculation line for enabling the recirculation of (RO) permeate through the (RO) membrane and a control system for causing the permeate delivery pump to operate so as to either provide water pressure to the delivery lines or to recirculate (RO) permeate through the (RO) membrane.

4. The apparatus according to claim 3 further comprising a circulation pump for recycling the portion of (RO) concentrate to the potable water and for recirculation of stored concentrate from said concentrate storage tank through the (MF) membrane, a line interconnecting the (MF) membrane and said concentrate storage tank enabling the recirculation of the stored concentrate from said concentrate storage tank and said control system is operable for causing the circulate pump to operate so as to recycle portion of the (RO) concentrate to the potable water and to recirculate stored concentrate from the concentrate storage tank through the (MF) membrane.

5. The apparatus according to claim 4 wherein said hydraulic pathways comprise a line interconnecting said concentrate storage tank and a drain for disposal of concentrate storage tank contents.

6. Apparatus for membrane softening of potable water, said apparatus comprising:
   a reverse osmosis (RO) membrane for non-chemical softening and demineralizing potable water, said reverse osmosis (RO) membrane producing an (RO) permeate and an (RO) concentrate;
   a microfiltration (MF) membrane for receiving the (RO) concentrate and producing an (MF) permeate and (MF) concentrate without chemical addition;
   hydraulic pathways for recycling the (MF) permeate to the potable water for return to said reverse osmosis (RO) membrane without addition of any chemical and at a pH level suitable for suppressing deposition of solids on the reverse osmosis (RO) membrane;
   a pressurized concentrate storage tank including initially disposed seed crystals, the storage tank being in fluid communication between the reverse osmosis (RO) membrane and the microfiltration (MF) membrane for receiving (RO) concentrate at a pH that is conducive to metastable precipitation of calcium carbonate on the seed crystals; and
   lines for delivery of (RO) permeate for use.

7. The apparatus according to claim 6 wherein said hydraulic pathways comprise a permeate storage tank interconnected between the (RO) membrane and the delivery lines.

8. The apparatus according to claim 7 further comprising a permeate delivery pump for both providing water pressure to the delivery lines and for recirculation of (RO) permeate through the (RO) membrane for cleaning thereof, a recirculation line for enabling the recirculation of (RO) permeate through the (RO) membrane and a control system for causing the permeate delivery pump to operate so as to either provide water pressure to the delivery lines or to recirculate (RO) permeate through the (RO) membrane.

9. The apparatus according to claim 8 further comprising a circulation pump for recycling the portion of (RO) concentrate to the potable water and for recirculation of stored concentrate from said concentrate storage tank through the (MF) membrane, a line interconnecting the (MF) membrane and said concentrate storage tank enabling the recirculation of the stored concentrate from said concentrate storage tank and said control system is operable for causing the circulate pump to operate so as to recycle the portion of the (RO) concentrate to the potable water and to recirculate stored concentrate from the concentrate storage tank through the (MF) membrane.

10. The apparatus according to claim 9 wherein said hydraulic pathways comprise a line interconnecting said concentrate storage tank and a drain for disposal of concentrate storage tank contents.

11. A method for softening and demineralizing of potable water, said method comprising the steps of:

providing a reverse osmosis (RO) membrane;

introducing potable water to said reverse osmosis (RO) membrane in order to produce an (RO) permeate and an (RO) concentrate;

providing a microfiltration (MF) membrane;

introducing the (RO) concentrate to said microfiltration (MF) membrane to produce an (MF) permeate and an (MF) concentrate;

recycling the (RO) permeate to the potable water for return to said reverse osmosis (RO) membrane;

recycling a portion of the (MF) concentrate to the potable water for return to said reverse osmosis (RO) membrane at a pH level suitable for suppressing deposition of solids on the reverse osmosis (RO) membrane;

providing a pressured concentrate storage tank including initially disposed seed crystals;

introducing the (RO) concentrate into said concentrate storage tank at a pH that is conducive to metastable precipitation of calcium carbonate on the seed crystals; and providing (RO) permeate for use through a delivery line.

12. The method according to claim 11 further comprising the steps of:

intermittently recirculation (RO) permeate through the (RO) membrane for cleaning thereof.

13. The method according to claim 12 further comprising the steps of:

intermittently recirculating stored concentrate from said concentrate storage tank through the (MF) membrane.

14. The method according to claim 13 further comprising the step of mixing concentrate from said concentrate storage tank with used (RO) permeate for disposal therewith.

15. A method for softening and demineralizing of potable water, said method comprising the steps of:

providing a reverse osmosis (RO) membrane;

introducing potable water to said reverse osmosis (RO) membrane in order to produce an (RO) permeate and an (RO) concentrate;

providing a microfiltration (MF) membrane;

introducing the (RO) concentrate to said microfiltration (MF) membrane to produce an (MF) permeate and an (MF) concentrate;

recycling the (MF) permeate to the potable water for return to said reverse osmosis (RO) membrane without addition of any chemical;

recycling a portion of the (RO) concentrate to the potable water for return to said reverse osmosis (RO) membrane without addition of any chemical and at a pH level suitable for suppressing deposition of solids on the reverse osmosis (RO) membrane;

providing a pressurized concentrate storage tank initially disposed including seed crystals;

introducing the (RO) concentrate into said concentrate storage tank at a pH that is conducive to metastable precipitation of calcium carbonate on the seed crystals; and providing (RO) permeate for use through a delivery line.

16. The method according to claim 15 further comprising the steps of:

intermittently recirculating (RO) permeate through the (RO) membrane for cleaning thereof.

17. The method according to claim 16 further comprising the steps of:

intermittently recirculating stored concentrate from said concentrate storage tank through the (MF) membrane.

18. The method according to claim 17 further comprising the step of mixing concentrate from said concentrate storage tank with said (RO) permeate for disposal therewith.

19. A water softening apparatus having a reverse osmosis (RO) membrane and a microfiltration (MF) membrane, a method comprising the steps of:

introducing potable water to said reverse osmosis (RO) membrane in order to produce an (RO) permeate and an (RO) concentrate;

introducing the (RO) concentrate to said microfiltration (MF) membrane to produce an (MF) permeate and an (MF) concentrate;

recycling the (MF) permeate to the potable water for return to said reverse osmosis (RO) membrane;

recycling a portion of the (RO) concentrate to the potable water for return to said reverse osmosis (RO) membrane at a pH level suitable for suppressing deposition of solids on the reverse osmosis (RO) membrane;

providing a pressurized concentrate storage tank including initially disposed seed crystals;

introducing the (RO) concentrate into said concentrate storage tank at a pH that is conducive to metastable precipitation of calcium carbonate on the seed crystals; and providing (RO) permeate for use through a delivery line.

20. The method according to claim 19 further comprising the steps of:

intermittently recirculating (RO) permeate through the (RO) membrane for cleaning thereof.

21. The method according to claim 19 further comprising the steps of:

intermittently recirculating stored concentrate from said concentrate storage tank through the (MF) membrane.

22. The method according to claim 21 further comprising the step of mixing concentrate from said concentrate storage tank with said (RO) permeate for disposal therewith.

* * * * *